(12) United States Patent
Takahashi

(10) Patent No.: US 10,785,200 B2
(45) Date of Patent: Sep. 22, 2020

(54) INFORMATION PROCESSING SYSTEM, INFORMATION PROCESSING TERMINAL, AND INFORMATION PROCESSING METHOD FOR REDUCING BURDEN OF ENTERING A PASSCODE UPON SIGNING IN TO A SERVICE

(71) Applicant: Rina Takahashi, Kanagawa (JP)

(72) Inventor: Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 15/820,690

(22) Filed: Nov. 22, 2017

(65) Prior Publication Data

US 2018/0152430 A1 May 31, 2018

(30) Foreign Application Priority Data

Nov. 29, 2016 (JP) ................................. 2016-231104
Feb. 23, 2017 (JP) ................................. 2017-032062

(51) Int. Cl.
| | | |
|---|---|---|
| *H04L 29/06* | (2006.01) | |
| *G06Q 50/00* | (2012.01) | |
| *H04L 29/08* | (2006.01) | |

(52) U.S. Cl.
CPC .............. *H04L 63/08* (2013.01); *G06Q 50/01* (2013.01); *H04L 67/10* (2013.01)

(58) Field of Classification Search
None
See application file for complete search history.

(56) References Cited

U.S. PATENT DOCUMENTS 9,369,284 B2 * 6/2016 McCoy ................... H04L 67/02
9,479,898 B2   10/2016 Aratsu et al.
(Continued)

FOREIGN PATENT DOCUMENTS

| JP | 2006-053870 | 2/2006 |
|---|---|---|
| JP | 2008-026413 | 2/2008 |

(Continued)

OTHER PUBLICATIONS

PCMag.com, "Encyclopedia, Definition of: Web Application", Nov. 13, 2015, www.pcmag.com/encyclopedia/term/54272/web-application; accessed via Archive.org, web.archive.org/web/20151113184016/https://www.pcmag.com/encyclopedia/term/54272/web-application on Nov. 27, 2019. (Year: 2015).*

*Primary Examiner* — Jeffery L Williams
(74) *Attorney, Agent, or Firm* — IPUSA, PLLC

(57) ABSTRACT

An information processing system is provided that includes a cloud server and an information processing terminal. The cloud server includes a storage device storing a program for using a cloud service and account information of a cloud account registered with the cloud service, and a first processor that manages execution of an authentication process for controlling access to the cloud service. The information processing terminal includes a second processor that executes processes of acquiring the program from the cloud server, sending a sign-up request to the cloud server to sign up for the cloud service using an external account of an external service, sending a setup request to the cloud server to set up a passcode or a character string to be used for signing in to the cloud service, and sending a sign-in request to the cloud server to sign in to the cloud service using the cloud account.

17 Claims, 23 Drawing Sheets

(56) References Cited

U.S. PATENT DOCUMENTS

| | | | |
|---|---|---|---|
| 9,716,724 B1* | 7/2017 | Chennuru | H04L 63/1433 |
| 9,825,925 B2* | 11/2017 | Hore | H04L 63/06 |
| 10,313,264 B2* | 6/2019 | Whalley | H04L 47/803 |
| 2003/0149781 A1* | 8/2003 | Yared | G06F 21/41 709/229 |
| 2013/0127688 A1* | 5/2013 | Amiya | G09G 5/00 345/2.3 |
| 2013/0246528 A1* | 9/2013 | Ogura | H04L 67/2814 709/204 |
| 2014/0078549 A1* | 3/2014 | Amiya | H04N 1/00233 358/1.15 |
| 2015/0121462 A1* | 4/2015 | Courage | H04L 63/08 726/4 |
| 2015/0128242 A1* | 5/2015 | Hoy | H04L 63/0884 726/9 |
| 2015/0181080 A1* | 6/2015 | Nuggehalli | H04L 63/083 358/1.15 |
| 2015/0248258 A1* | 9/2015 | Ding | G06F 3/1222 358/1.15 |
| 2015/0253928 A1* | 9/2015 | Yamanaka | G06F 3/0421 345/175 |
| 2015/0288522 A1* | 10/2015 | McCoy | H04L 67/02 726/9 |
| 2015/0350106 A1* | 12/2015 | Whalley | H04L 47/803 709/225 |
| 2016/0134599 A1* | 5/2016 | Ross | H04L 63/08 713/168 |
| 2017/0006020 A1* | 1/2017 | Falodiya | H04L 63/0815 |
| 2017/0012980 A1* | 1/2017 | Sanso | H04L 63/10 |
| 2017/0070624 A1* | 3/2017 | Hanada | G03G 15/502 |
| 2017/0171201 A1* | 6/2017 | Matsugashita | G06F 21/6245 |
| 2017/0171425 A1* | 6/2017 | Park | H04N 1/00381 |
| 2018/0034796 A1* | 2/2018 | Ross | H04L 63/08 |
| 2018/0083941 A1* | 3/2018 | Thakkar | H04L 63/08 |
| 2018/0152430 A1* | 5/2018 | Takahashi | H04L 67/10 |
| 2019/0273732 A1* | 9/2019 | Thakkar | H04L 63/0807 |
| 2019/0334884 A1* | 10/2019 | Ross | G06F 21/31 |

FOREIGN PATENT DOCUMENTS

| | | |
|---|---|---|
| JP | 2015-087907 | 5/2015 |
| JP | 2015-141691 | 8/2015 |
| JP | 5808643 | 11/2015 |
| JP | 5876621 | 3/2016 |
| WO | 2013/058029 | 4/2013 |
| WO | 2016/121042 | 8/2016 |

\* cited by examiner

FIG.5

| SIGN-IN TIME | ACCOUNT ID | USER NAME | EMAIL ADDRESS | EXTERNAL SERVICE |
|---|---|---|---|---|
| 2016/10/24 19:00 | 001 | USER A | aaa@first-service.com | FIRST SERVICE |
| 2016/10/24 18:00 | 003 | USER C | ccc@second-service.com | SECOND SERVICE |
| 2016/10/24 17:00 | 002 | USER B | bbb@first-service.com | FIRST SERVICE |
| 2016/10/24 16:00 | 001 | USER A | aaa@first-service.com | FIRST SERVICE |
| ... | ... | ... | ... | ... |

FIG.7

| ACCOUNT ID | PASSCODE | USER NAME | EMAIL ADDRESS | EXTERNAL SERVICE |
|---|---|---|---|---|
| 001 | AAA | USER A | aaa@first-service.com | FIRST SERVICE |
| 002 | BBB | USER B | bbb@first-service.com | FIRST SERVICE |
| 003 | CCC | USER C | ccc@second-service.com | SECOND SERVICE |
| 004 | DDD | USER D | ddd@second-service.com | SECOND SERVICE |
| ... | ... | ... | ... | ... |

PRINT FROM CLOUD

YOU CAN EASILY PRINT FROM SERVICE YOU'RE USING.

SIGN-IN AND PRINT

TO USE PRINT SERVICE, PLEASE PERFORM USER REGISTRATION WITH YOUR FIRST SERVICE ACCOUNT OR SECOND SERVICE ACCOUNT.

USER REGISTRATION

FIG.16

HISTORY INFORMATION STORAGE PROCESS
HAS FAILED.

SELECTION OF "SIGN-IN BASED ON HISTORY"
WILL BE INVALIDATED.

OK

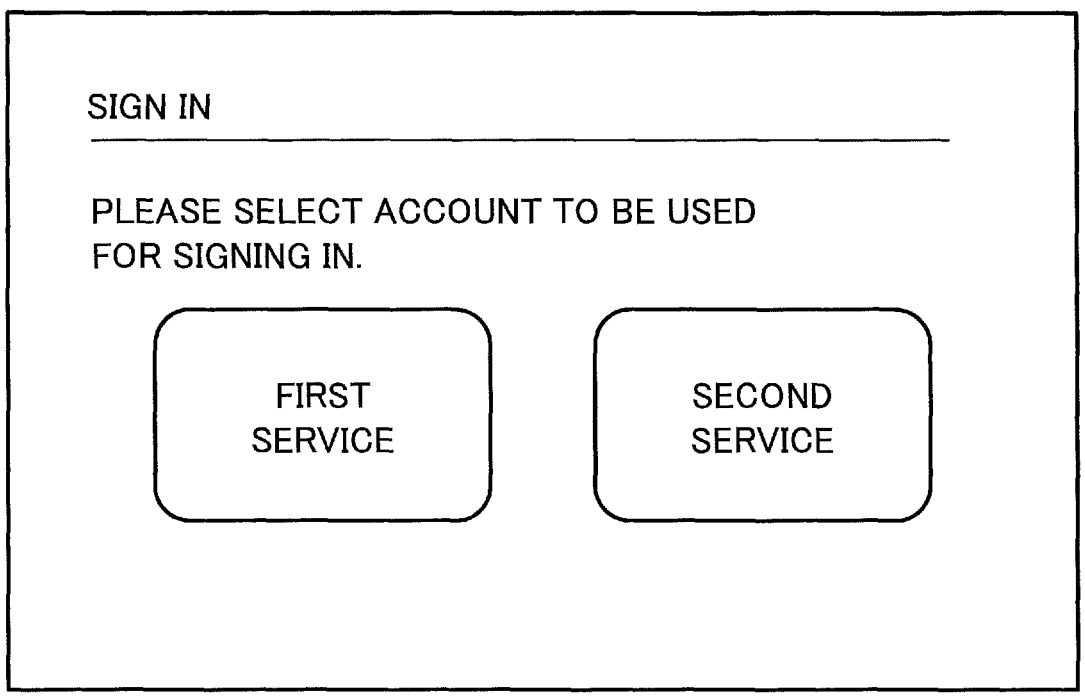

FIG.22

| ACCOUNT ID | PASSCODE | USER NAME | EMAIL ADDRESS | EXTERNAL SERVICE | SIGN-IN TIME |
|---|---|---|---|---|---|
| 001 | AAA | USER A | aaa@first-service.com | FIRST SERVICE | 2016/10/24 19:00 |
| 002 | BBB | USER B | bbb@first-service.com | FIRST SERVICE | 2016/10/24 18:00 |
| 003 | CCC | USER C | ccc@second-service.com | SECOND SERVICE | 2016/10/24 17:00 |
| 004 | DDD | USER D | ddd@second-service.com | SECOND SERVICE | 2016/10/24 16:00 |
| ... | ... | ... | ... | ... | ... |

INFORMATION PROCESSING SYSTEM, INFORMATION PROCESSING TERMINAL, AND INFORMATION PROCESSING METHOD FOR REDUCING BURDEN OF ENTERING A PASSCODE UPON SIGNING IN TO A SERVICE

CROSS-REFERENCE TO RELATED APPLICATIONS

The present application claims priority under 35 U.S.C. § 119 to Japanese Patent Application No. 2016-231104 filed on Nov. 29, 2016 and Japanese Patent Application No. 2017-032062 filed on Feb. 23, 2017, the entire contents of which are incorporated herein by reference.

BACKGROUND OF THE INVENTION

1. Field of the Invention

The present invention relates to an information processing system, an information processing terminal, and an information processing method.

2. Description of the Related Art

In recent years, services such as SNS (Social Network Services) and cloud services have become widespread such that many people have at least one of these service accounts. As such, techniques have been developed for enabling a user to sign in to a target service using an account for another service that the user already owns. According to such a technique, the user can sign in to the target service by entering account information, such as an account ID and a passcode, of the account for the other service owned by the user.

However, when signing in to a target service from a terminal, such as an MFP (Multi-Functional Peripheral), with an operation panel, it may take time and effort to enter the account ID and passcode of the account owned by the user.

SUMMARY OF THE INVENTION

According to one embodiment of the present invention, an information processing system is provided that includes a cloud server and an information processing terminal. The cloud server includes a storage device storing a program for using a cloud service and account information of a cloud account registered with the cloud service, and a first processor that manages execution of an authentication process for controlling access to the cloud service. The information processing terminal includes a second processor that executes processes of acquiring the program from the cloud server, sending a sign-up request to the cloud server to sign up for the cloud service using an external account of an external service, sending a setup request to the cloud server to set up a passcode or a character string to be used for signing in to the cloud service, and sending a sign-in request to the cloud server to sign in to the cloud service using the cloud account.

BRIEF DESCRIPTION OF THE DRAWINGS

FIG. 5 is a diagram illustrating an example of a history information table included in a history information storage unit according to a first embodiment of the present invention;

FIG. 7 is a diagram illustrating an example of an account information table included in an account information storage unit according to the first embodiment;

FIG. 16 is a diagram illustrating an example of an error screen displayed when a process of storing history information fails;

FIG. 20 is a diagram illustrating an example of a second sign-in screen;

FIG. 21 is a diagram illustrating an example of a history information table included in a history information storage unit according to a second embodiment of the present invention;

FIG. 22 is a diagram illustrating an example of an account information table included in an account information storage unit according to the second embodiment;

DESCRIPTION OF THE EMBODIMENTS

Figure 1:
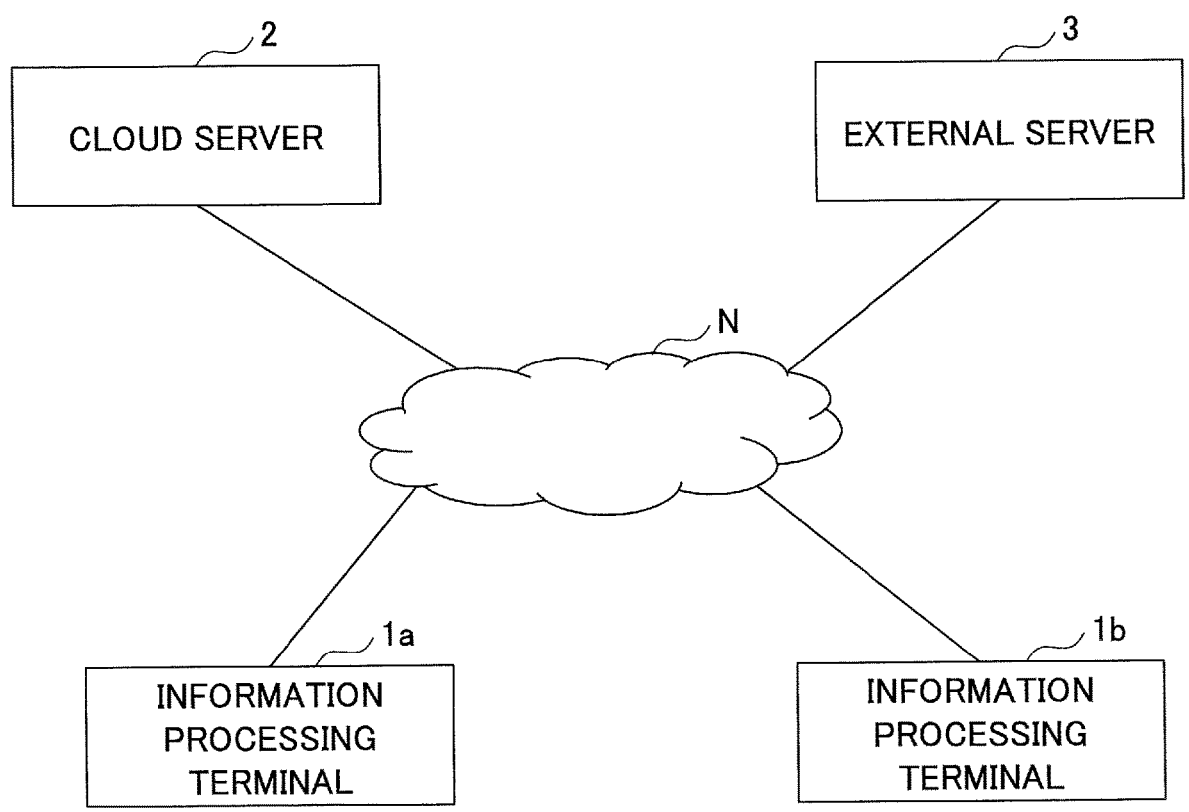
FIG. 1 is a diagram illustrating an example configuration of an information processing system.

An aspect of the present invention is directed to providing an information processing system, an information processing terminal, and an information processing method that can reduce the burden of entering a passcode upon signing in to a service.

In the following, embodiments of the present invention are described with reference to the accompanying drawings. Note that in the description of embodiments and the drawings, elements having substantially the same functions and features are given the same reference numerals and overlapping explanations may be omitted.

First Embodiment

In the following, an information processing system according to a first embodiment of the present invention will be described with reference to FIGS. 1 to 20. First, the configuration of the information processing system will be described.

FIG. 1 is a diagram illustrating an example configuration of the information processing system according to the present embodiment. The information processing system of FIG. 1 includes information processing terminals 1a and 1b, a cloud server 2, and an external server 3. The information processing terminals 1a and 1b, the cloud server 2, and the external server 3 are connected via a network N, such as the Internet or a LAN (Local Area Network).

The information processing terminals 1a and 1b are client computers that can receive a cloud service from the cloud server 2. A user uses the information processing terminal 1a or 1b to use a cloud service. A user having an account for an external service (hereinafter referred to as "external account") can input account information of the external account to the information processing terminal 1a or 1b to register an account for a cloud service (hereinafter referred to as "cloud account"). Note that registering for an account is referred to as "sign-up".

The account information of the external account may include an account ID (identifier) and a passcode, for example. The passcode of the external account is a numerical value of several digits (e.g., four digits) to be input by the user together with the account ID upon signing in to the external service. Note that in some embodiments, a character string of several characters may be used instead of a passcode, for example. Further, the account information of the external account may include a user name, an email address, an affiliation, gender, a phone number, an address, occupation, date of birth, and/or a URL (Uniform Resource Locator) of an icon photo, for example. The account information of the external account is managed by the external server 3. A user that has registered a cloud account for a cloud service can sign in to the cloud service by inputting the account information of the cloud account to the information processing terminal 1a or 1b.

The information processing terminals 1a and 1b are computers that can communicate with the cloud server 2 via the network N. For example, the information processing terminals 1a and 1b may be MFPs, printing machines, copiers, scanners, facsimile machines, refrigerators, washing machines, microwave ovens, PCs (Personal Computers), tablet terminals, mobile phones, smartphones, and the like. Note that although the information processing system of FIG. 1 includes two information processing terminals 1a and 1b, three or more information processing terminals may be included. Further, the information processing system may include plural types of information processing terminals. In the following descriptions, each information processing terminal included in the information processing system will generically be referred to as "information processing terminal 1".

The cloud server 2 is a server computer that provides a cloud service to the information processing terminal 1. The cloud service may be any type of service. Note that although a cloud service is provided by one cloud server 2 in the example of FIG. 1, in other examples, a cloud service may be provided by a plurality of cloud servers 2. When the information processing system includes a plurality of cloud servers 2 that provide a cloud service, the installation location, size, and configuration of each cloud server 2 may be freely arranged.

The external server 3 is a server computer that provides an external service different from the cloud service. The external service may be a service provided by Google (registered trademark), Microsoft (registered trademark), Facebook (registered trademark), and the like. In the present embodiment, it is assumed that the user already has an external account (e.g., a Google account, a Microsoft account, or a Facebook account). Note that although an external service is provided by one external server 3 in the example of FIG. 1, in other examples, an external service may be provided by a plurality of external servers 3. When the information processing system includes a plurality of external servers 3 that provide an external service, the installation location, size, and configuration of each external server 3 may be freely arranged.

Figure 2:
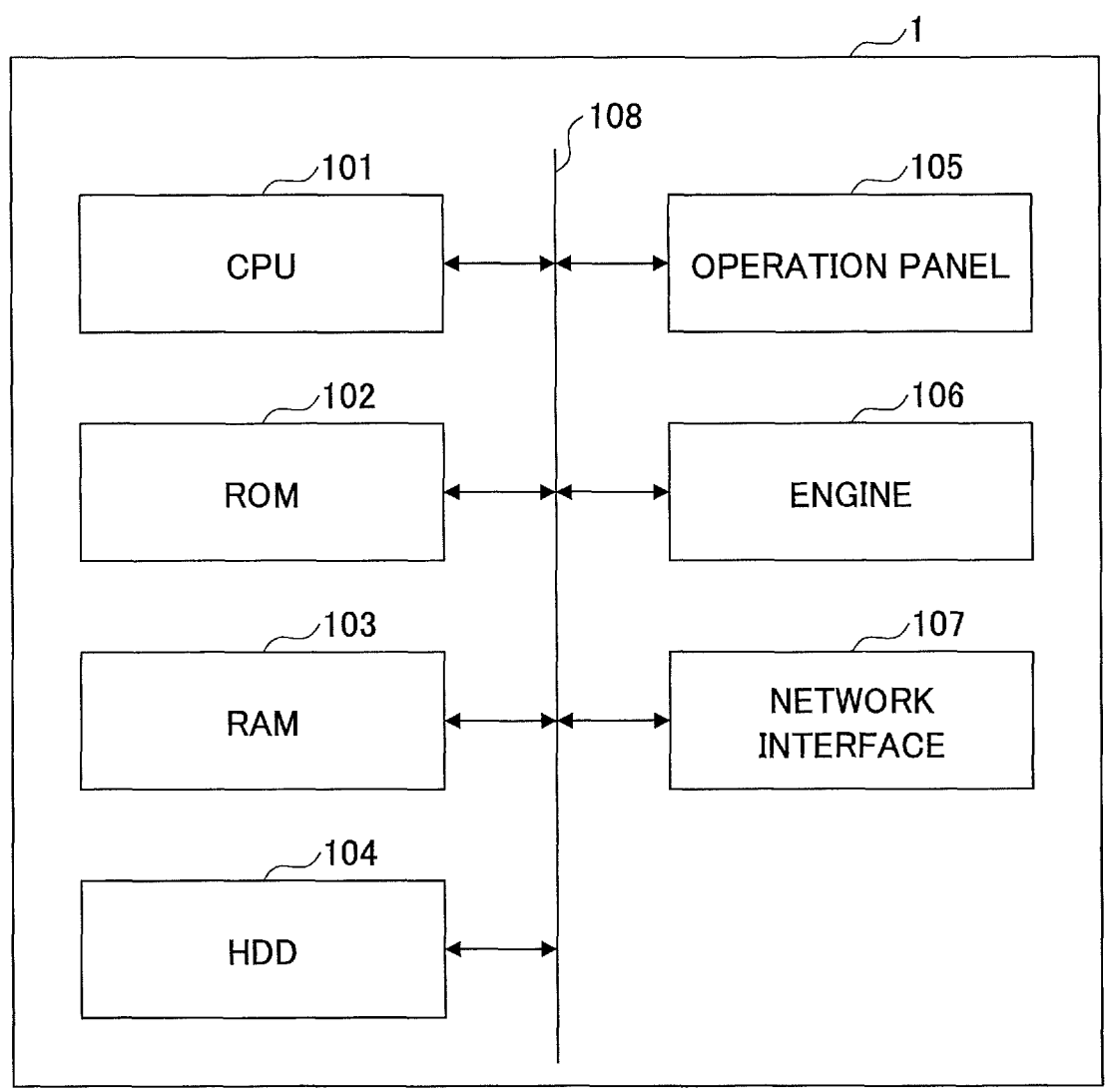
FIG. 2 is a diagram illustrating an example hardware configuration of an information processing terminal.

In the following, the hardware configuration of the information processing terminal 1 will be described. FIG. 2 is a diagram illustrating an example hardware configuration of the information processing terminal 1. In the example of FIG. 2, it is assumed that the information processing terminal 1 is an MFP. In FIG. 2, the information processing terminal 1 includes a CPU (Central Processing Unit) 101, a ROM (Read-Only Memory) 102, a RAM (Random Access Memory) 103, and a HDD (Hard Disk Drive) 104. Further, the information processing terminal 1 includes an operation panel 105, an engine 106, a network interface 107, and a bus 108.

The CPU 101 controls the components of the information processing terminal 1 and implements functions of the information processing terminal 1 by executing a program. The ROM 102 stores various data including programs to be executed by the CPU 101. The RAM 103 provides a work area for the CPU 101. The HDD 104 stores various data including programs to be executed by the CPU 101. The operation panel 105 is an input/output device including a display device, such as a liquid crystal display or an organic EL (Electro Luminescence) display, and an input device, such as a touch panel or a hardware key. The engine 106 executes a job in response to an instruction from a user. The engine 106 may include a printing machine, a copying machine, a scanner, and a facsimile, for example. The network interface 107 connects the information processing terminal 1 to the network N. The information processing terminal 1 communicates with external devices (e.g., the cloud server 2 and the external server 3) connected to the network N via the network interface 107. The bus 108 communicably connects the components of the information processing terminal 1 with each other.

Figure 3:
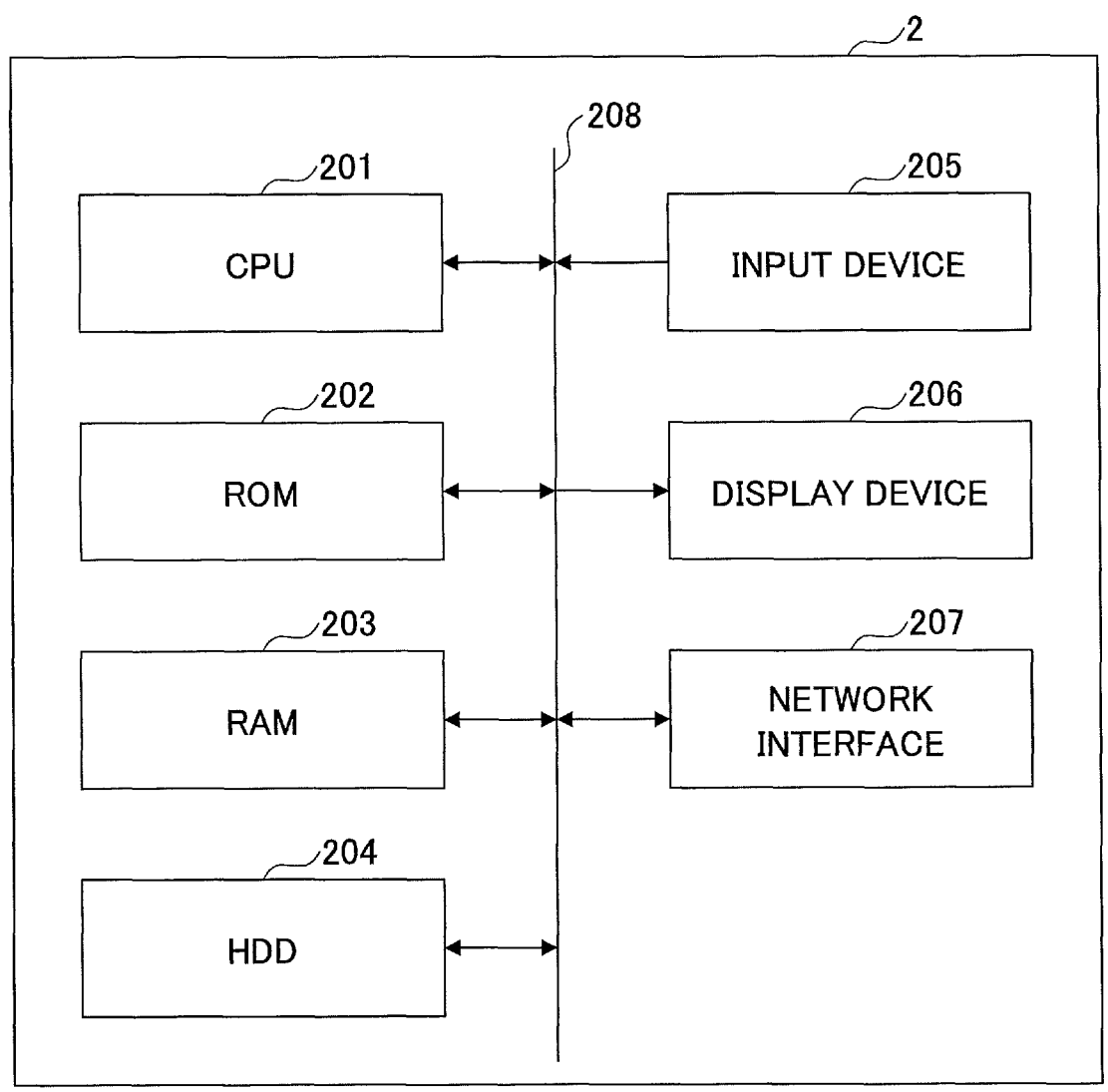
FIG. 3 is a diagram illustrating an example hardware configuration of a cloud server.

In the following, the hardware configuration of the cloud server 2 will be described. FIG. 3 is a diagram illustrating an example hardware configuration of the cloud server 2. In FIG. 3, the cloud server 2 includes a CPU 201, a ROM 202, a RAM 203, and an HDD 204. Further, the cloud server 2 includes an input device 205, a display device 206, a network interface 207, and a bus 208.

The CPU 201 controls components of the cloud server 2 and implements functions of the cloud server 2 by executing a program. The ROM 202 stores various data including programs to be executed by the CPU 201. The RAM 203 provides a work area for the CPU 201. The HDD 204 stores various data including programs to be executed by the CPU 201. The input device 205 may include a keyboard, a mouse, a hardware key, a touch panel, and the like. The display device 206 may be a liquid crystal display or an organic EL display, for example. The network interface 207 connects the cloud server 2 to the network N. The cloud server 2 communicates with external devices (e.g., the information processing terminal 1 and the external server 3) connected to the network N via the network interface 207. The bus 208 communicably connects the components of the cloud server 2 with each other.

Note that the hardware configuration of the external server 3 may be substantially identical to the hardware configuration of the cloud server 2, and as such, its description will be omitted.

Figure 4:
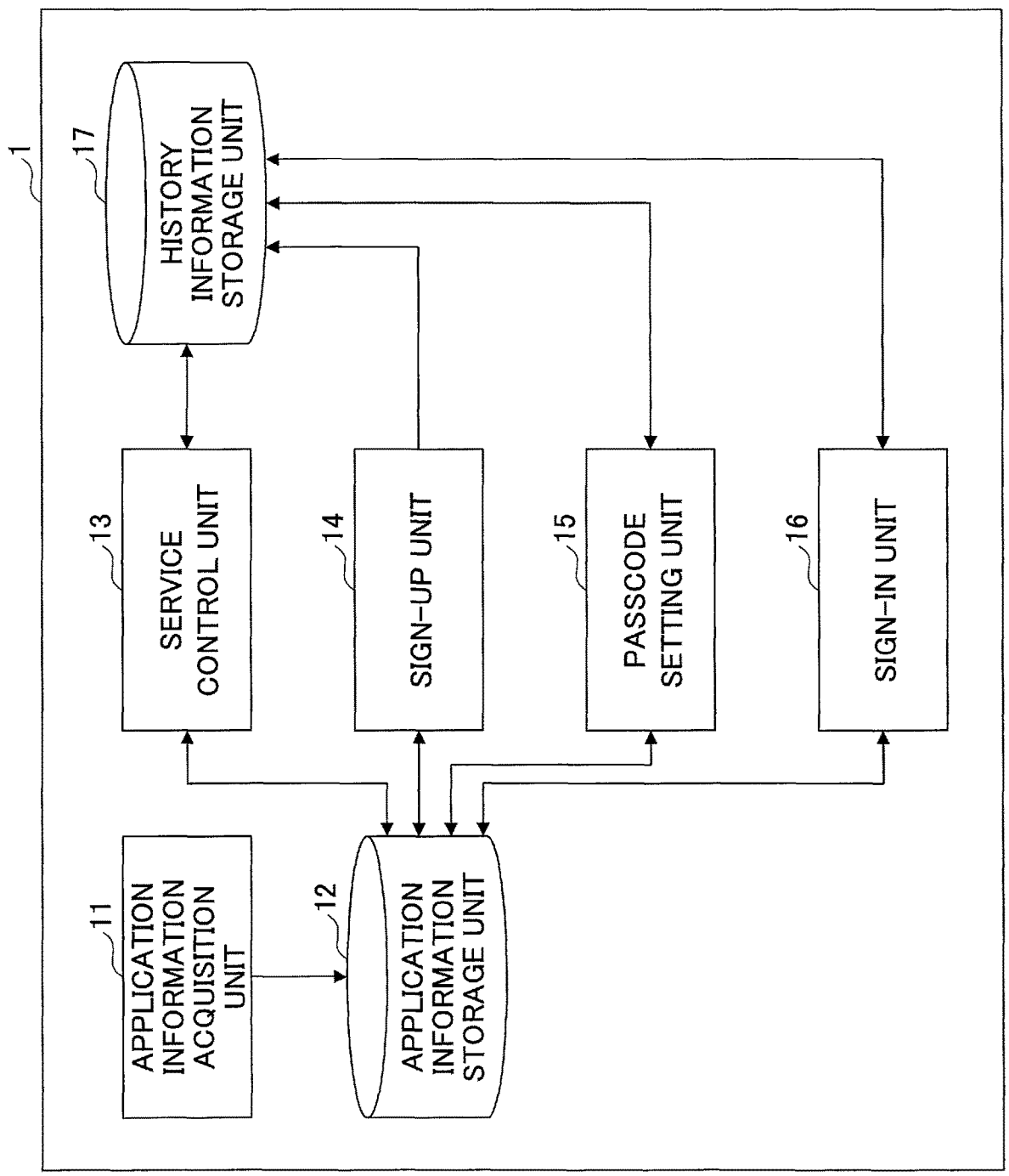
FIG. 4 is a diagram illustrating an example functional configuration of the information processing terminal.

In the following, the functional configuration of the information processing terminal 1 will be described. FIG. 4 is a diagram illustrating an example functional configuration of the information processing terminal 1. In FIG. 4, the information processing terminal 1 includes an application information acquisition unit 11, an application information storage unit 12, a service control unit 13, a sign-up unit 14, a passcode setting unit 15, a sign-in unit 16, and a history information storage unit 17.

Each of the above functional units is implemented by the CPU 101 executing a program. In the following, it is assumed that the program implementing the functional units of the information processing terminal 1 is executed on a browser. Note, however, that the program may also be implemented by an independent application that is capable of accessing the cloud server 2 and may be executed on an OS (Operating System), for example.

The application information acquisition unit 11 accesses the cloud server 2 via the network N and acquires application information from the cloud server 2.

The application information storage unit 12 stores the application information acquired by the application information acquisition unit 11. The application information is information relating to an application for using a cloud service. The application information includes a cloud application and a screen definition.

The cloud application is an application (program) for using a cloud service and may be described using JavaScript (registered trademark), for example. The CPU 101 executes the cloud application on a browser to implement the functions of the service control unit 13, the sign-up unit 14, the passcode setting unit 15, the sign-in unit 16, and the history information storage unit 17, for example. In other words, the service control unit 13, the sign-up unit 14, the passcode setting unit 15, the sign-in unit 16, and the history information storage unit 17 are not implemented by the information processing terminal 1 until the cloud application is executed.

The screen definition is information defining a screen to be displayed on the display device of the information processing terminal 1 and is used for accessing a cloud service. The screen definition may be described using HTML (Hyper Text Markup Language) or CSS (Cascading Style Sheets), for example. The information processing terminal 1 refers to the screen definition and displays a predetermined screen on the display device.

The service control unit 13 controls overall execution of the cloud service.

The sign-up unit 14 sends a sign-up request to the cloud server 2 to sign up for a cloud service using an external account (i.e., to register a cloud account with the cloud service). In response to such a sign-up request, the cloud server 2 executes an authentication process and an authorization process in conjunction with the external server 3, and based on the results of these processes, the cloud server 2 creates and registers a cloud account. The cloud account includes account information including an account ID and a passcode. The account information of the cloud account is managed by the cloud server 2.

The passcode setting unit 15 sends a setup request to the cloud server 2 to set up a passcode for the cloud account. In response to such a setup request, the cloud server 2 sets up a passcode for the cloud account. The passcode for the cloud account is a numerical value of several digits (e.g., four digits) to be entered by the user together with the account ID upon signing in with the cloud service. The passcode for the cloud service is set up separately from the passcode for the external account. Note that in some embodiments, a character string of several characters can be used instead of a simple numeric passcode, for example. In the present embodiment, the passcode for the cloud account is preferably made up of numerals only so that the passcode can be easily input from an input device such as the operation panel 105. Further, in some embodiments, the passcode for the cloud account may be required to include at least a certain number of characters (e.g., 6 characters) in order to improve security, for example.

The sign-in unit 16 sends a sign-in request to the cloud server 2 to sign in to the cloud service. In response to such a sign-in request, the cloud server 2 executes an authentication process and an authorization process, and based on the results of these processes, the cloud server 2 authorizes or denies access (sign-in) to the cloud service.

In the present embodiment, the information processing terminal 1 can sign in to the cloud service using one of two methods. The two different sign-in methods will be described below.

The first sign-in method involves signing in to the cloud service using a cloud account. In the first sign-in method, the sign-in unit 16 sends to the cloud server 2, the account information of the cloud account of the user that is attempting to sign in to the cloud service. In turn, the cloud server 2 executes an authentication process and an authorization process using the account information of the cloud account received from the sign-in unit 16 and the account information of the cloud account managed by the cloud server 2. Based on the results of the authentication process and the authorization process, the cloud server 2 authorizes or denies the user access (sign-in) to the cloud service. In the case of signing in to the cloud service using the first sign-in method, the user can input the passcode of the cloud account to the information processing terminal 1 to sign in to the cloud service.

The second sign-in method involves signing in to the cloud service using an external account. In the second sign-in method, the sign-in unit 16 sends to the cloud server 2, the account information of the external account of the user that is attempting to sign in. The cloud server 2 executes an authentication process and an authorization process in conjunction with the external server 3 using the account information of the external account received from the sign-in unit 16. Based on the results if the authentication and authorization processes, the cloud server 2 authorizes or denies the user access (sign-in) to the cloud service. In the case of signing in to the cloud service using the second sign-in method, the user can input the passcode of the external account to the information processing terminal 1 to sign in to the cloud service.

In the present embodiment, the user selects the sign-in method to be used by the sign-in unit 16. The method of selecting the sign-in method will be described in detail below.

The history information storage unit 17 stores history information of a user that has signed in to the cloud service. The history information includes the account ID of the cloud account of the user that has signed in, the sign-in time, and information relating to the external service (hereinafter referred to as "external service information") of the external account used by the user upon signing up for the cloud service. The external service information may include the name of the external service and the account information of the external service, for example. Note that the history information does not include the passcode for the cloud account.

FIG. 5 is a diagram illustrating an example of a history information table included in the history information storage unit 17 according to the present embodiment. The history information table is for storing records of history information. A new record of history information is added to the history information table each time a user signs in to the cloud service. Note that each record in the table of FIG. 5 corresponds to history information relating to one sign-in event. The history information in FIG. 5 includes information items such as, sign-in time, account ID of the cloud account, and external service information (user name, email address, and name of external service).

For example, with respect to the first row of history information in the history information table of FIG. 5, the sign-in time is "2016/10/24 19:00", the account ID of the cloud account is "001", the user name is "user A", the user ID is "aaa@first-service.com", and the name of the external service is "first service". With respect to the second row of history information in FIG. 5, the sign-in time is "2016/10/24 18:00", the account ID of the cloud account is "003", the user name is "user C", the user ID is "ccc@second-service.com", and the name of the external service is "second service". As can be appreciated from the above, in the present embodiment, it is assumed that the information processing terminal 1 is used by a plurality of users (users A, B, C, etc.).

Note that in some embodiments, an upper limit may be set up for the number of records of history information that can be stored in the history information storage unit 17. In this case, when the number of records of the history information stored in the history information storage unit 17 exceeds the upper limit, the history information storage unit 17 may delete the oldest record of history information based on the sign-in time, for example. Also, in some embodiments, an upper limit may be set up for the storage duration of the history information stored in the history information storage unit 17. In this case, the history information storage unit 17 may delete the history information that has been stored for a duration exceeding the upper limit. Also, in some embodiments, the history information storage unit 17 may only store history information with the latest sign-in time for each user. In this case, when history information of a given user is newly added, the history information storage unit 17 may delete the history information that is stored in association with the corresponding user. The above are example measures that may be implemented to reduce the required storage capacity of the history information storage unit 17.

Figure 6:
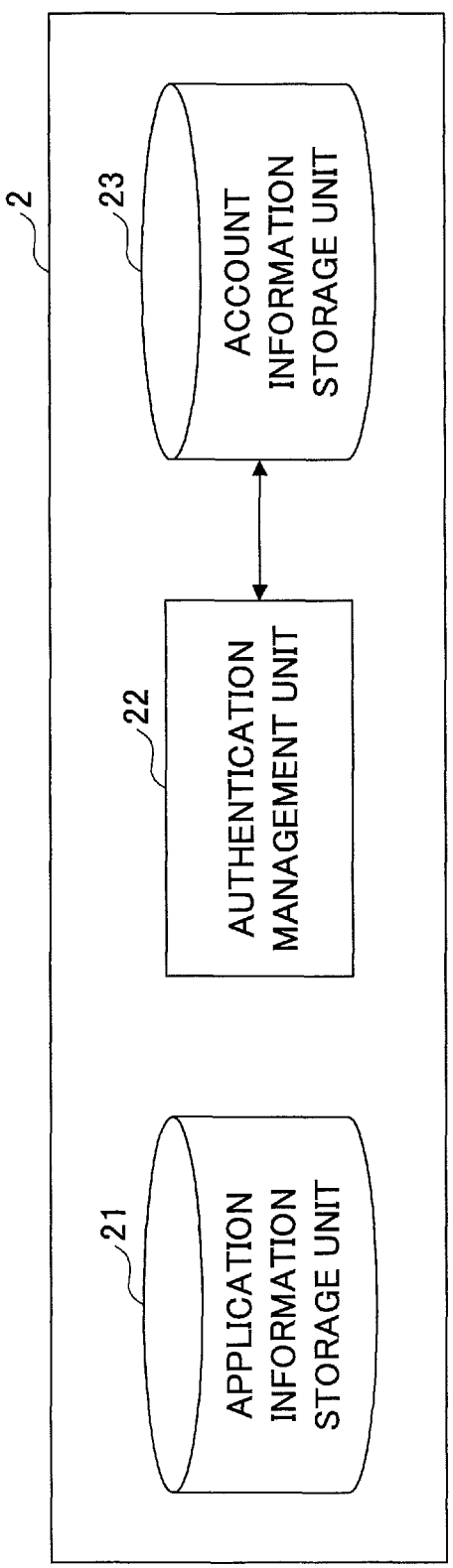
FIG. 6 is a diagram illustrating an example functional configuration of the cloud server.

In the following, the functional configuration of the cloud server 2 will be described. FIG. 6 is a diagram illustrating an example functional configuration of the cloud server 2. In FIG. 6, the cloud server 2 includes an application information storage unit 21, an authentication management unit 22, and an account information storage unit 23.

The application information storage unit 21 stores application information. The application information storage unit 21 sends application information to the information processing terminal 1 via the network N in response to an application information acquisition request from the information processing terminal 1.

The authentication management unit 22 manages execution of a sign-up process, a passcode setting process, and a sign-in process in response to a request from the information processing terminal 1.

The account information storage unit 23 stores account information of each user having a cloud account registered with the cloud service. The account information stored in the account information storage unit 23 includes account information of the cloud account and external service information. In the account information storage unit 23, the account information of the cloud account and the external service information are stored in association with each user.

FIG. 7 is a diagram illustrating an example of an account information table included in the account information storage unit 23 according to the present embodiment. The account information table is for storing account information of the cloud account of each user. A new record of account information is added each time a new cloud account is registered with the cloud service. Each record of account information in the table of FIG. 7 corresponds to account information of a cloud account of a user. The account information table of FIG. 7 includes information items, such as account information (account ID and passcode) of the cloud account and external account information (user name, email address, and external service name).

For example, with respect to the first row of account information in the account information table of FIG. 7, the account ID is "001", the passcode is "AAA", the user name is "user A", the email address is "aaa@first-service.com", and the name of the external service is "first service".

In the following, a sign-up process, a passcode setting process, and a sign-in process that are executed in the information processing system according to the present embodiment will be described. In the example described below, it is assumed that the information processing terminal 1 is an MFP.

Figure 8:
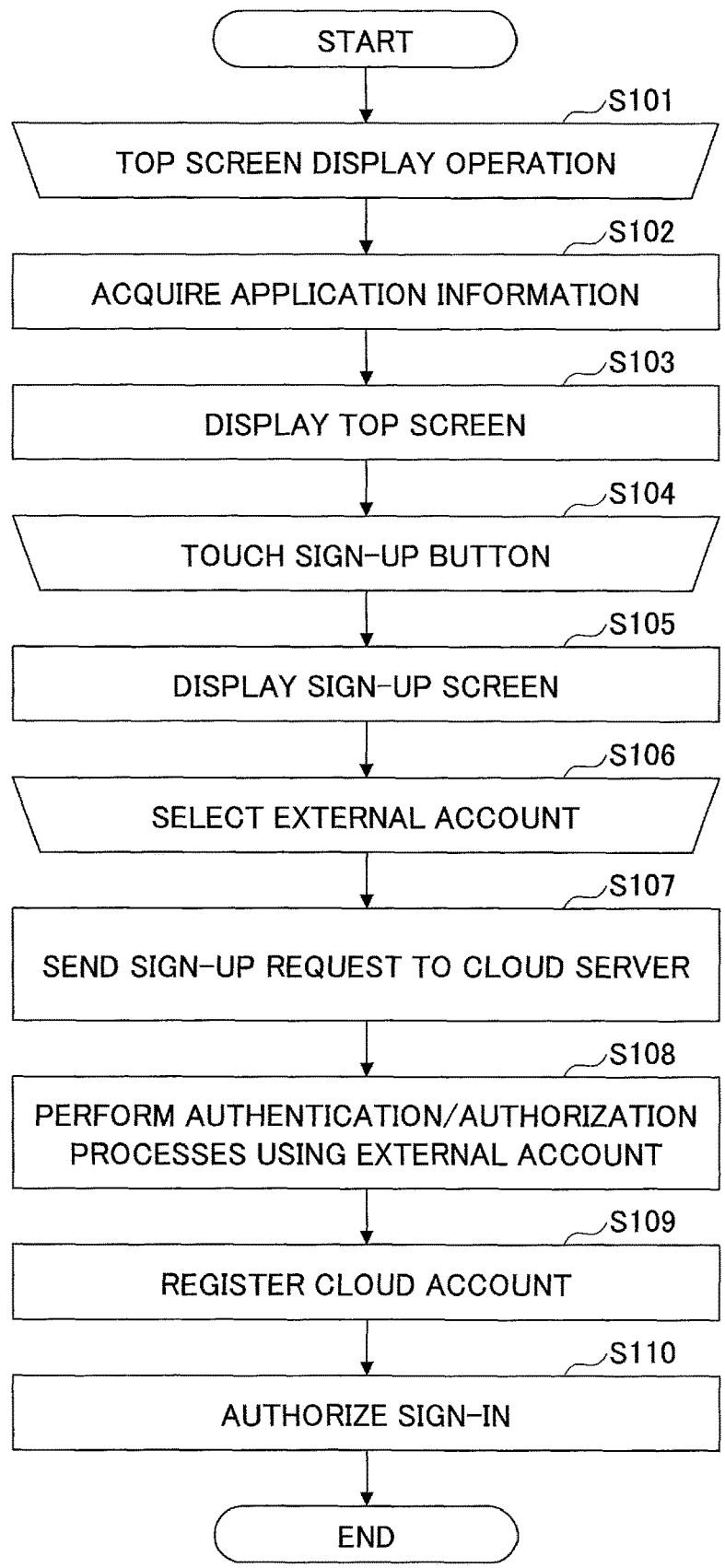
FIG. 8 is a flowchart illustrating example process operations of a sign-up process.

First, the sign-up process will be described below. FIG. 8 is a flowchart illustrating example process operations of the sign-up process. In the example described below, it is assumed that the user that is signing up has not yet registered a cloud account with the cloud service.

The user performs a display operation for displaying a top screen of the cloud service on the operation panel 105 of the information processing terminal 1 (step S101). The display operation may involve the user touching an icon representing the cloud service that is displayed on a menu screen of the operation panel 105, for example.

When the user performs the display operation, the application information acquisition unit 11 accesses the cloud server 2 to request for application information. In response to such a request, the application information storage unit 21 of the cloud server 2 sends the requested application information to the information processing terminal 1. When the information processing terminal 1 receives the application information from the cloud server 2, the application information acquisition unit 11 of the information processing terminal 1 acquires the application information (step S102). The application information acquisition unit 11 stores the acquired application information in the application information storage unit 12.

When the application information is stored in the application information storage unit 12, a browser executes the cloud application included in the application information, and the service control unit 13 causes the cloud application to start processing. The service control unit 13 causes the operation panel 105 to display a top screen of the cloud service by referring to the screen definition included in the application information (step S103). The top screen is a screen for selecting whether to sign in or sign up for the cloud service.

Figure 9:
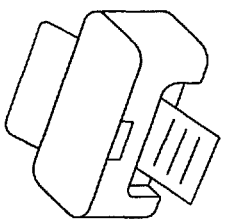
FIG. 9 is a diagram illustrating an example of a top screen.

FIG. 9 is a diagram illustrating an example of the top screen. In the example of FIG. 9, the cloud service is a print service. The top screen of FIG. 9 displays a sign-in button ("sign in and print") for signing in to the cloud service and a sign-up button ("user registration") for signing up for the cloud service.

In the description below, it is assumed that the user touches the sign-up button displayed on the top screen (step S104). When the sign-up button is touched, the sign-up unit 14 refers to the screen definition included in the application information and causes the operation panel 105 to display a sign-up screen of the cloud service (step S105). The sign-up screen is a screen for selecting an external account to be used for signing up for the cloud service.

Figure 10:
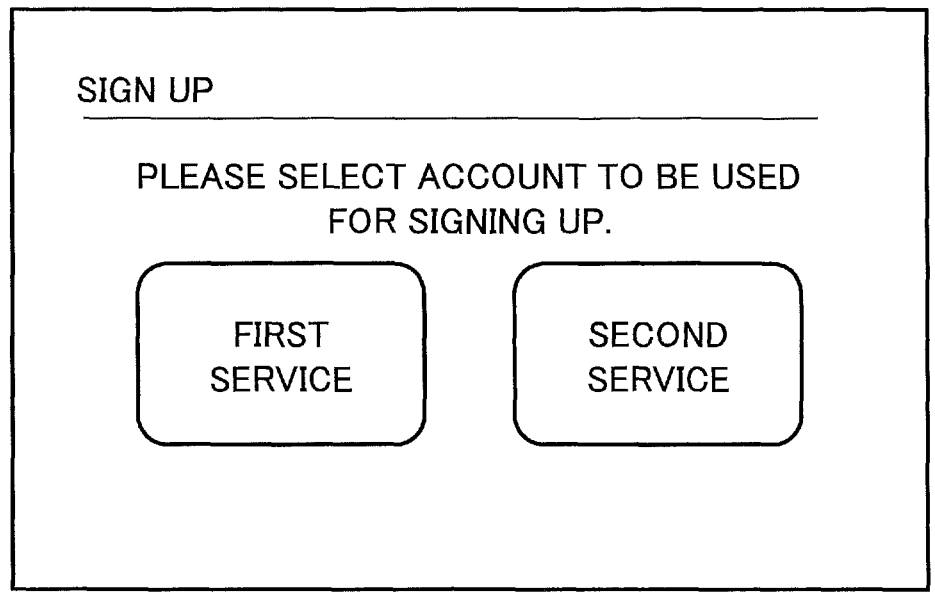
FIG. 10 is a diagram illustrating an example of a sign-up screen.

FIG. 10 is a diagram illustrating an example of the sign-up screen. The sign-up screen of FIG. 10 displays a "first service" button for using the account for a first service as the external account and a "second service" button for using the account for a second service as the external account.

When the sign-up screen is displayed, the user selects the external account to be used for signing up (step S106). In the example of FIG. 10, the user can select the account for the first service by touching the "first service" button, or select the account for the second service by touching the "second service" button.

When the user selects the external account to be used for signing up, the sign-up unit 14 sends a sign-up request to the authentication management unit 22 of the cloud server 2 to sign up for the cloud service (step S107). At this time, the sign-up unit 14 notifies the authentication management unit 22 of the external account selected by the user.

Upon receiving the sign-up request from the sign-up unit 14, the authentication management unit 22 executes authentication and authorization processes on the user based on standards, such as Open ID Connect and OAuth 2.0, in conjunction with the external server 3 that corresponds to the service provider of the external account notified by the sign-up unit 14 (step S108). At this time, the authentication management unit 22 requests the user to input account information (user ID and passcode) of the external account via the operation panel 105 of the information processing terminal 1. The authentication management unit 22 executes the authentication process and the authorization process with respect to the user based on the account information of the external account input by the user.

When the authentication process and the authorization process are successful, the authentication management unit 22 creates and registers a new cloud account (step S109). Specifically, the authentication management unit 22 generates account information (account ID) of the new cloud account and stores the generated account information in association with the external service information in the account information storage unit 23. The external service information can be acquired from the external server 3 during the authentication process and the authorization process. At this point in time, the passcode of the cloud account is not yet set up, and as such, the passcode is not included in the account information of the cloud account.

After registering the cloud account, the authentication management unit 22 authorizes the user to sign in to the cloud service (step S110) and notifies the service control unit 13 that the user has been authorized to sign in. At this time, the authentication management unit 22 notifies the service control unit 13 of the account information of the cloud account of the user that has been authorized to sign in. In this way, the user can sign up and sign in to the cloud service. As can be appreciated, the second sign-in method (signing in using an external account) is used to sign in to the cloud service upon signing up with the cloud service. Thereafter, the passcode setting unit 15 executes a passcode setting process of setting up a passcode of the cloud account.

Figure 11:
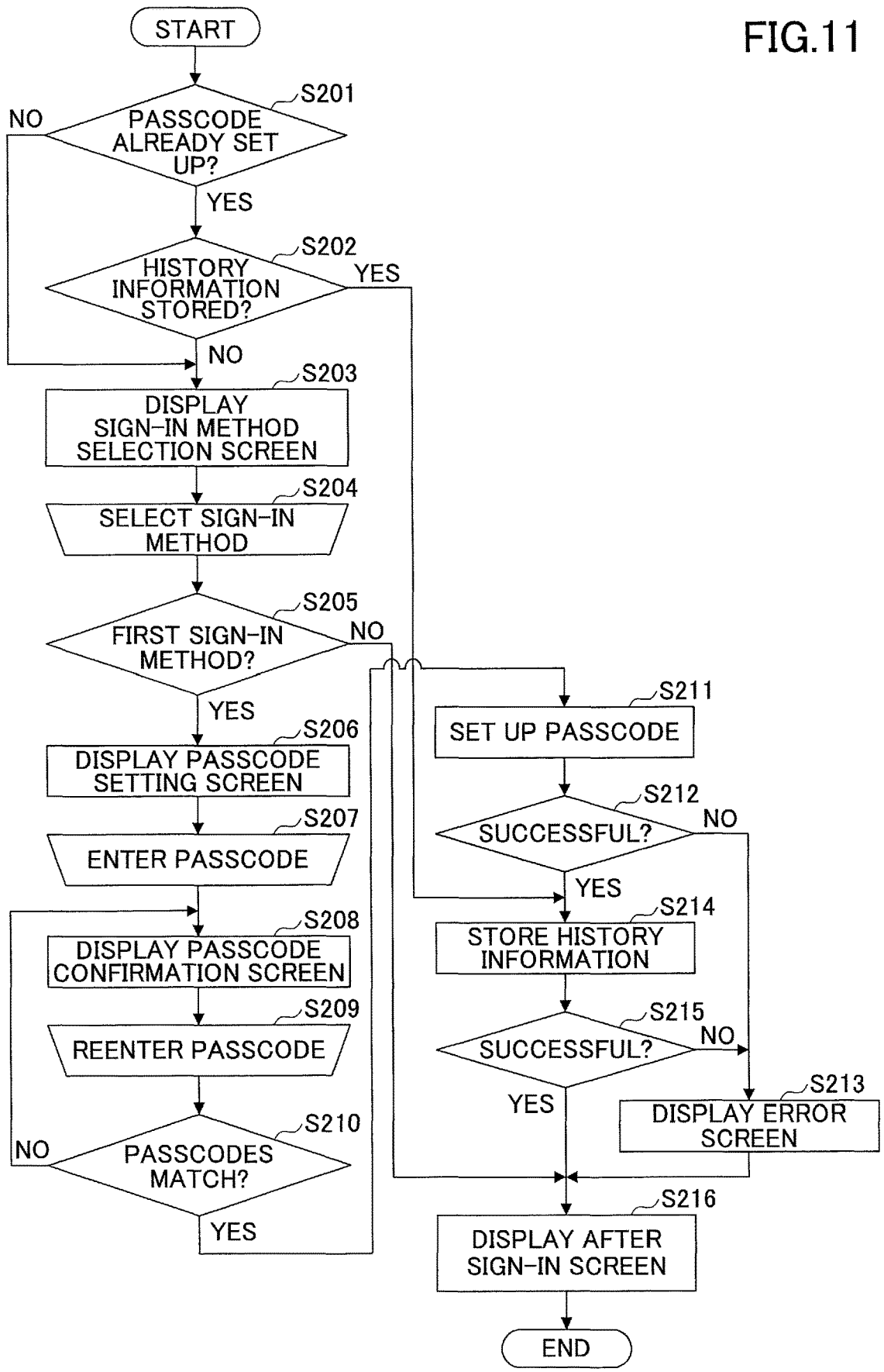
FIG. 11 is a flowchart illustrating example process operations of a passcode setting process.

In the following, the passcode setting process of setting up a passcode of the cloud account will be explained. FIG. 11 is a flowchart illustrating example process operations of the passcode setting process. The process of FIG. 11 is started when the service control unit 13 receives the account information of the cloud account from the authentication management unit 22.

Upon receiving a sign-in authorization notification and the account information of the corresponding cloud account used to sign in from the authentication management unit 22, the service control unit 13 determines whether a passcode is set up for the corresponding cloud account (step S201). The service control unit 13 may determine whether the passcode is set up for the corresponding cloud account by determining whether the received account information includes a passcode, for example. Alternatively, the service control unit 13 may receive information indicating whether the passcode is set up together with the account information, for example.

If a passcode is not yet set up for the corresponding cloud account (NO in step S201), the process proceeds to step S203. As described above, because a passcode is not yet set up at the time the sign-up process is executed, the process proceeds to step S203 after the sign-up process. Note that the process of step S203 will be described in detail below.

On the other hand, if a passcode is already set up (YES in step S201), the service control unit 13 determines whether history information of the user owning the cloud account is stored in the history information storage unit 17 (step S202). Specifically, the service control unit 13 searches the history information table using the account ID of the cloud account included in the received account information as a search key, and determines whether history information including the account ID is stored in the history information table.

If history information of the user is stored (YES in step S202), the process proceeds to step S214. Note that the process of step S214 will be described in detail below. On the other hand, if history information of the user is not stored (NO in step S202), the process proceeds to step S203.

In step S203, the service control unit 13 refers to the screen definition included in the received application information and causes the operation panel 105 to display a sign-in method selection screen for selecting the sign-in method to be used to sign in to the cloud service. The sign-in method selection screen enables the user to select the first sign-in method or the second sign-in method as the sign-in method to be used.

Figure 12:
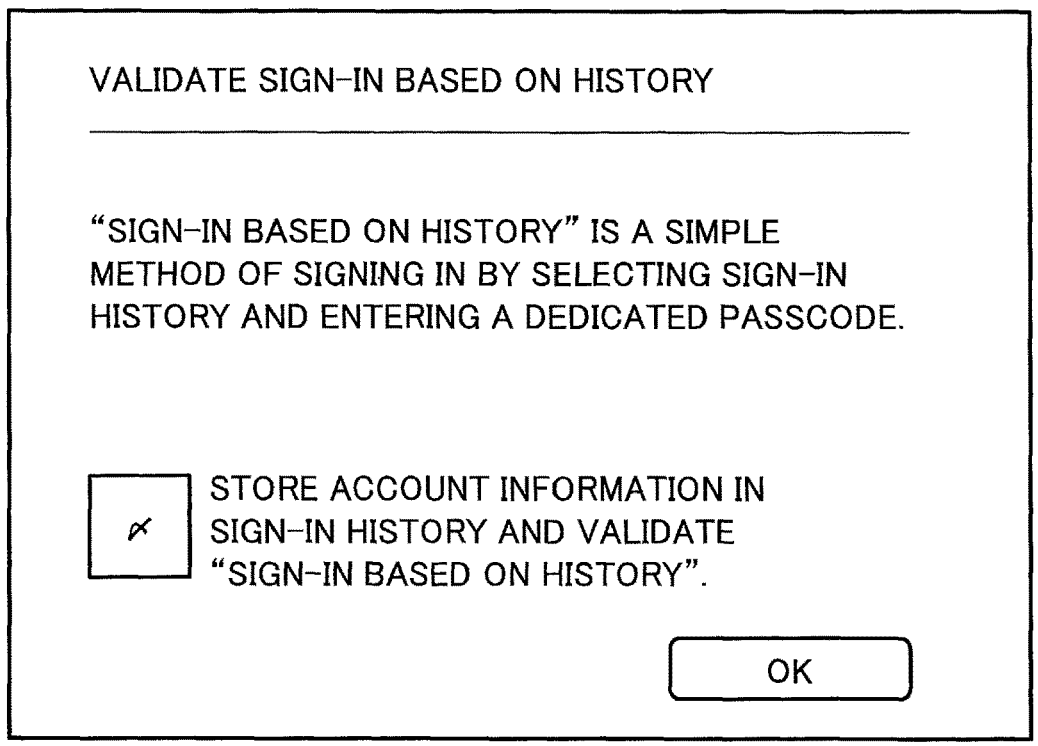
FIG. 12 is a diagram illustrating an example of a sign-in method selection screen.

FIG. 12 is a diagram illustrating an example of the sign-in method selection screen. In FIG. 12, "sign in based on history" corresponds to the first sign-in method. The selection screen of FIG. 12 displays a check box for validating the first sign-in method and an apply button (OK button).

When the sign-in method selection screen is displayed, the user selects the sign-in method to be used (step S204). In the example of FIG. 12, the user can select the first sign-in method by checking the check box and touching the apply button (OK button). Alternatively, the user can select the second sign-in method by leaving the check box unchecked and touching the apply button (OK button). That is, when the first sign-in method is invalidated, the second sign-in method is selected.

If the second sign-in method is selected by the user (NO in step S205), the process proceeds to step S216. That is, when the second sign-in method is selected, the passcode of the cloud account is unnecessary and the user can sign in without inputting a passcode of the cloud account.

On the other hand, if the first sign-in method is selected by the user (YES in step S205), the passcode setting unit 15 refers to the screen definition included in the application information and causes the operation panel 105 to display a passcode setting screen (step S206). The passcode setting screen is a screen for enabling the user to set up a passcode of the cloud account.

Figure 13:
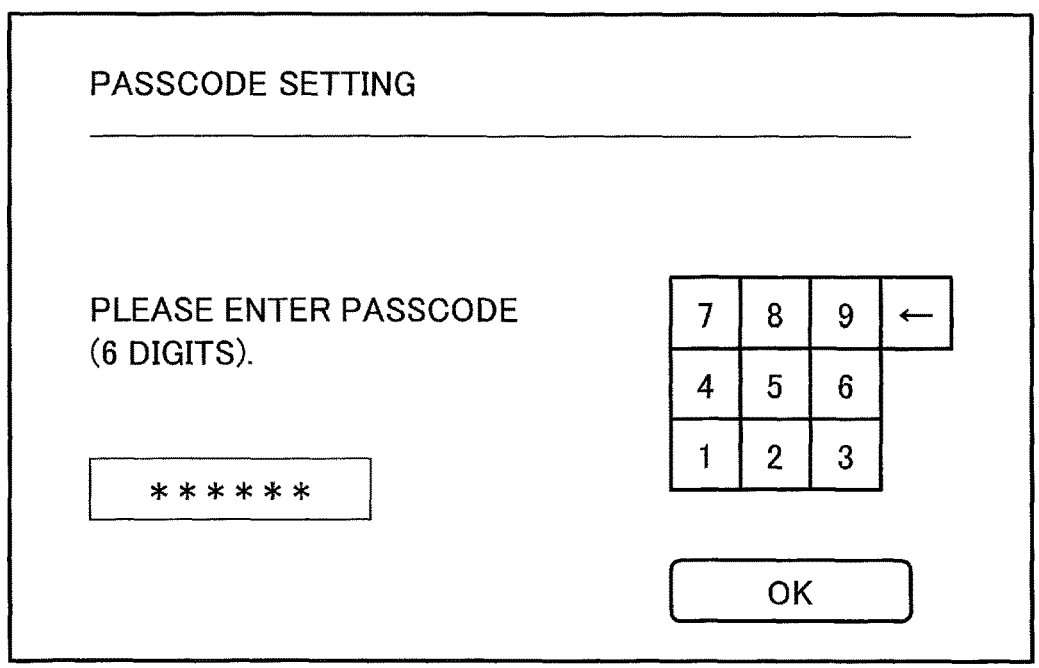
FIG. 13 is a diagram illustrating an example of a passcode setting screen.

FIG. 13 is a diagram illustrating an example of the passcode setting screen. In the example of FIG. 13, the passcode of the cloud account is a six-digit number. The passcode setting screen of FIG. 13 displays a numeric keypad for inputting numbers and an apply button (OK button). Note that in some embodiments, the numeric keypad may be displayed on a separate screen that can be displayed on the operation panel 105 simultaneously with the passcode setting screen, for example.

When the passcode setting screen is displayed, the user can touch the numeric keypad displayed on the passcode setting screen to enter a desired passcode (a six-digit number in the example of FIG. 13) (step S207) and touch the apply button (OK button) to set up the passcode of the cloud account.

When the apply button (OK button) is touched, the passcode setting unit 15 refers to the screen definition included in the application information and causes the operation panel 105 to display a passcode confirmation screen (step S208). The passcode confirmation screen is a screen for prompting the user to reenter the passcode in order to check whether there is an error in the passcode entered by the user.

Figure 14:
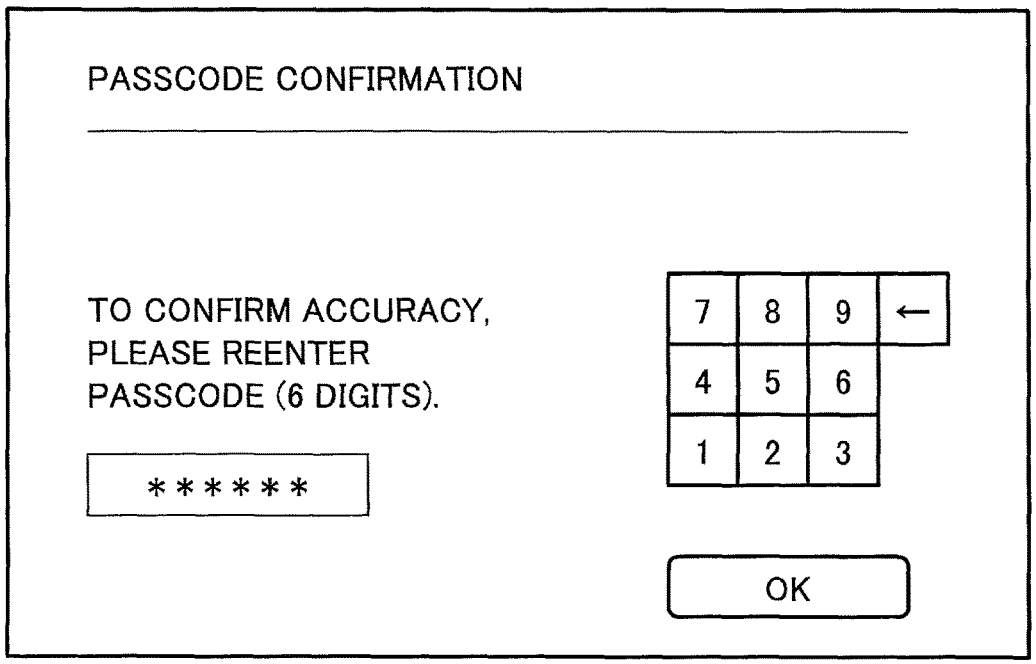
FIG. 14 is a diagram illustrating an example of a passcode confirmation screen.

FIG. 14 is a diagram illustrating an example of the passcode confirmation screen. The passcode confirmation screen of FIG. 14 displays a numeric keypad for entering numbers and an apply button (OK button). Note that as with the passcode setting screen, the numeric keypad may be displayed on a separate screen that can be displayed on the operation panel 105 simultaneously with the passcode setting screen, for example.

When the confirmation screen is displayed, the user touches the numeric keypad displayed on the confirmation screen to reenter the desired passcode (six-digit number in the example of FIG. 14) (step S209) and touches the apply button (OK button).

When the apply button (OK button) is touched, the passcode setting unit 15 determines whether the passcode entered in the passcode setting screen matches the passcode entered in the passcode confirmation screen (step S210). When the passcode entered in the passcode setting screen is different from the passcode entered in the passcode confirmation screen (NO in step S210), the process returns to step S208. That is, the passcode setting unit 15 causes the operation panel 105 to display the passcode confirmation screen once again. At this time, the passcode setting unit 15 preferably displays on the passcode confirmation screen, a message indicating that the passcode entered in the previously displayed passcode confirmation screen was different from the passcode entered in the passcode setting screen. In this way, the user may be informed that the passcode has been erroneously entered.

On the other hand, if the passcode entered in the passcode setting screen matches the passcode entered in the passcode confirmation screen (YES in step S210), the process proceeds to step S211. In step S211, the passcode setting unit 15 requests the authentication management unit 22 of the cloud server 2 to set up the passcode entered by the user. At this time, the passcode setting unit 15 notifies the authentication management unit 22 of the passcode entered by the user. In response to such a request, the authentication management unit 22 adds the notified passcode to the account information of the cloud account stored in the account information storage unit 23 as the passcode of the cloud account of the user. As a result, the passcode entered by the user is set up as the passcode of the cloud account of the user. The authentication management unit 22 then notifies the passcode setting unit 15 that the passcode of the cloud account has been set up.

Note that when the passcode setting process ends in failure (NO in step S212), the passcode setting unit 15 refers to the screen definition included in the application information and causes the operation panel 105 to display an error screen (step S213). This error screen is a screen for notifying the user that the passcode setting process has failed. The passcode setting process may end in failure when a communication error occurs between the information processing terminal 1 and the cloud server 2 while setting up the passcode, for example.

Figure 15:
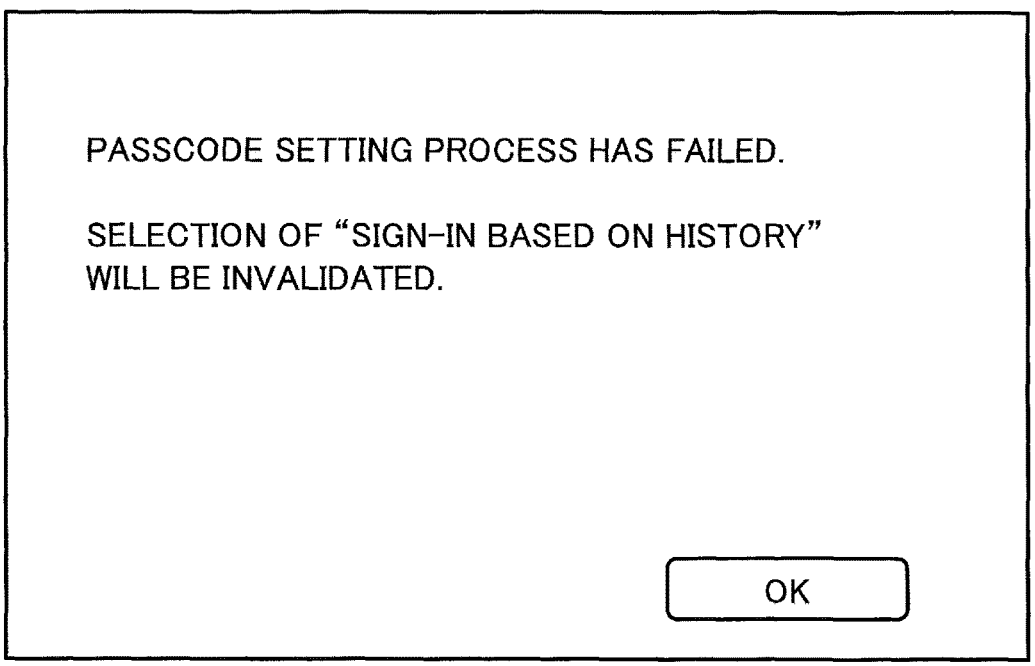
FIG. 15 is a diagram illustrating an example of an error screen displayed when a process of setting up a passcode fails.

FIG. 15 is a diagram illustrating an example of the error screen displayed when the passcode setting process fails. The error screen of FIG. 15 displays a message indicating that the passcode setting process has failed, a message indicating that the selection of the first sign-in method will be invalidated, and an apply button (OK button). By viewing the messages displayed on the error screen, the user may be informed that the passcode setting process has failed and that the selection of the first sign-in method will be invalidated. Note that the selection of the first sign-in method is invalidated in this case because the passcode necessary for using the first sign-in method could not be properly set up. Once the user views the messages, the user can acknowledge these messages by touching the apply button. When the apply button is touched, the process proceeds to step S216 without setting up a passcode of the cloud account.

On the other hand, if the passcode setting process is successful (YES in step S212), the passcode setting unit 15 stores history information of the user based on the account information of the cloud account acquired in step S202 (step S214). That is, the passcode setting unit 15 stores account information other than the passcode (account ID, user name, etc.) of the cloud account in association with the sign-in time of the user in the history information storage unit 17 as history information of the user. Note that when it is determined in step S202 that history information of the user is already stored (YES in step S202), the process proceeds to step S214 in order to update the history information of the user.

As can be appreciated, in the present embodiment, the history information is stored in the information processing terminal 1 rather than the cloud server 2. This is implemented for security purposes. That is, when the history information is stored in the cloud server 2, the history information may be accessible to all the information processing terminals 1 included in the information processing system. Thus, in order to prevent a decrease in security, in the present embodiment, history information is stored in the information processing terminal 1 only when the user actually uses the cloud account and selects to store the history information in the information processing terminal 1 (selects to use the first sign-in method). In this way, security of the information processing system can be improved.

Also, in the present embodiment, the history information does not include the passcode of the cloud account. In this way, security of the information processing system can be further improved.

Note that when the process of storing the history information ends in failure (NO in step S215), the passcode setting unit 15 refers to the screen definition included in the application information and causes the operation panel 105 to display an error screen (step S213). This error screen is a screen for informing the user that the process of storing the history information has failed. The process of storing the history information may fail when a communication error occurs between the passcode setting unit 15 and the history information storage unit 17 while storing the history information, for example.

FIG. 16 is a diagram illustrating an example of the error screen displayed when the process of storing the history information fails. The error screen of FIG. 16 displays a message indicating that the process of storing the history information was unsuccessful, a message indicating that the selection of the first sign-in method will be invalidated, and an apply button (OK button). By viewing the messages displayed on the error screen, the user may be informed that the process of storing the history information has failed and the selection of the first sign-in method will be invalidated. Note that the selection of the first sign-in method is invalidated in this case because the history information necessary for using the first sign-in method could not be stored. Once the user views the messages, the user may acknowledge the messages by touching the apply button (OK button). When the apply button is touched, the process proceeds to step S216.

On the other hand, when the process of storing the history information is successful (YES in step S215), the passcode setting unit 15 refers to the screen definition included in the application information and causes the operation panel 105 to display an after sign-in screen to be displayed after the user signs in to the cloud service (step S216). Thereafter, the user can use the cloud service via the after sign-in screen.

As can be appreciated from the above, even when the passcode setting process or the history information storage process ends in failure, the after sign-in screen to be displayed after the user signs in can still be displayed because the user has already signed in to the cloud service using the external account of the user at the beginning of the process of FIG. 11.

Note that when at least one of the passcode setting process and the history information storage process end in failure, the selection of the first sign-in method is invalidated as described above. As such, the user will be signing in to the cloud service using the second sign-in method the next time the user is to use the cloud service.

Figure 17:
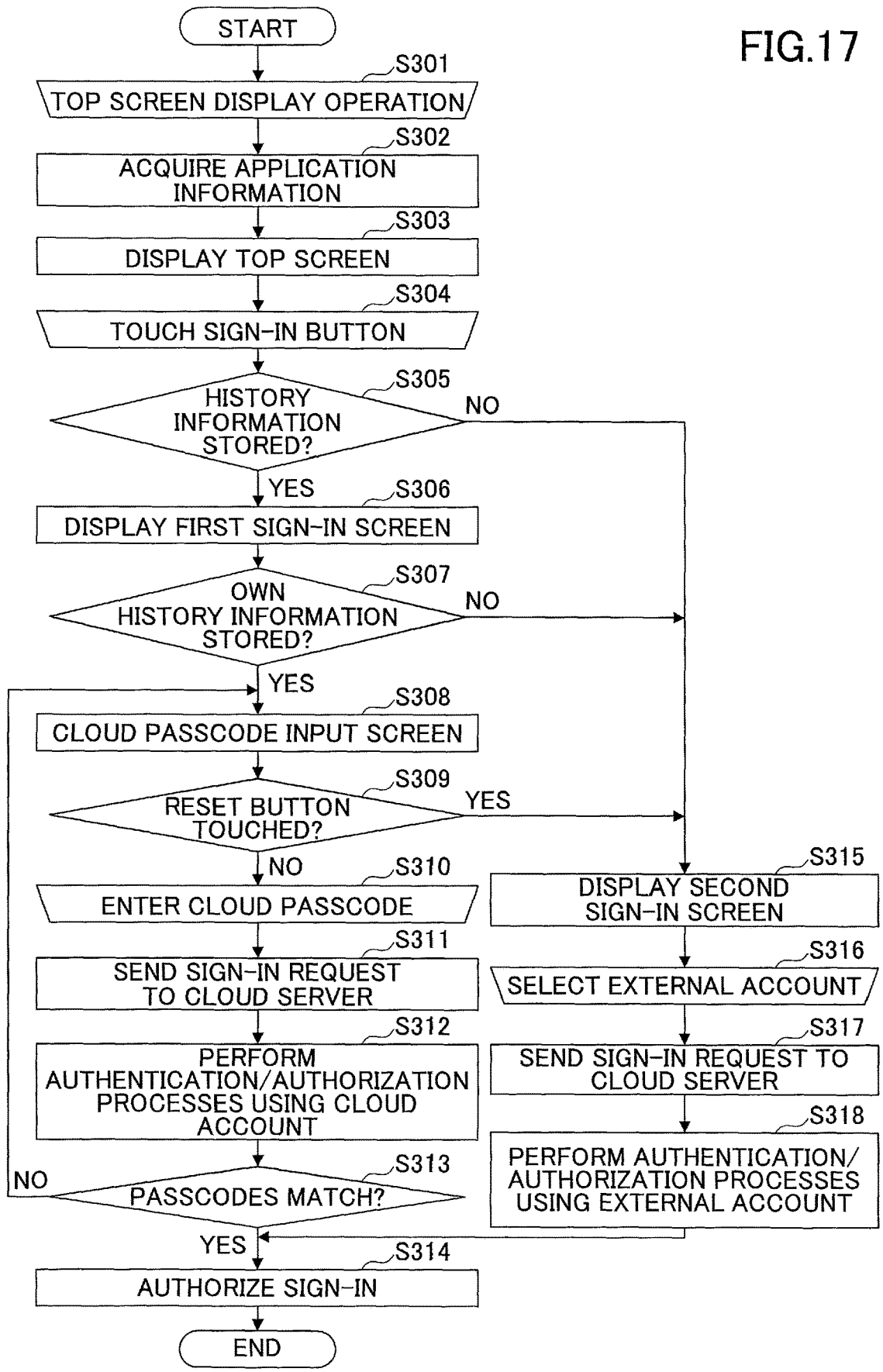
FIG. 17 is a flowchart illustrating example process operations of a sign-in process.

In the following, the sign-in process will be described. FIG. 17 is a flowchart illustrating example process operations of the sign-in process. In the description below, it is assumed that the cloud account of the user has already been registered. Also, note that the processes of steps S301 to S303 of FIG. 17 are substantially identical to the processes of steps S101 to S103 of FIG. 8, and as such, descriptions thereof will be omitted.

In order to start the sign-in process, the user touches the sign-in button displayed on the top screen illustrated in FIG. 9 (step S304). When the sign-in button is touched, the sign-in unit 16 determines whether at least one record of history information is stored in the history information storage unit 17 (step S305). When no history information is stored in the history information storage unit 17 (NO in step S305), the process proceeds to step S315. That is, if no history information is stored, no user can use the first sign-in method. Note that the process of step S315 will be described in detail below. In the case where no history information is stored, history information may have been deleted by a user.

On the other hand, if at least one record of history information is stored in the history information storage unit 17 (YES in step S305), the process proceeds to step S306. In step S306, the sign-in unit 16 refers to the screen definition included in the application information and causes the operation panel 105 to display a first sign-in screen of the cloud service. The first sign-in screen is a screen for signing in to the cloud service using the first sign-in method. The first sign-in screen displays a user button corresponding to each user having history information stored in the history information storage unit 17. Note that each user button may indicate information specifying the user corresponding to the user button. The information to be indicated may be one or more information items selected from the history information, for example.

Figure 18:
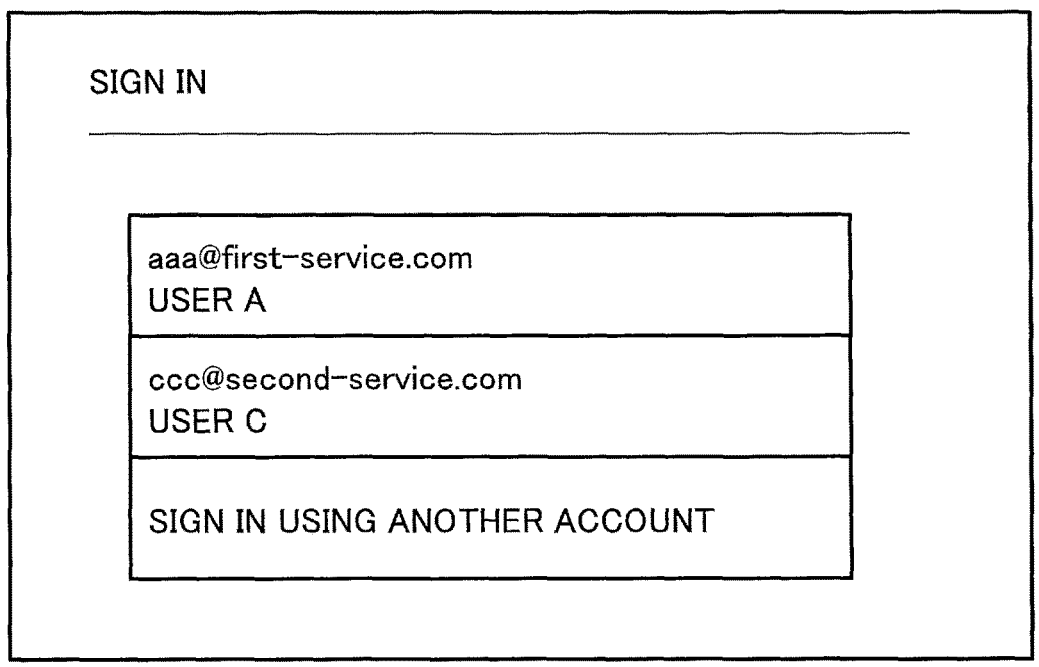
FIG. 18 is a diagram illustrating an example of a first sign-in screen.

FIG. 18 is a diagram illustrating an example of the first sign-in screen. The first sign-in screen of FIG. 18 displays two user buttons respectively corresponding to users A and C and an external account button ("sign-in with another account") for selecting the second sign-in method. In the example of FIG. 18, the email address and the user name of the corresponding user are indicated in each user button.

Note that in some embodiments, an upper limit may be imposed for the number of user buttons that can be simultaneously displayed on the first sign-in screen by the sign-in unit 16. In this case, the sign-in unit 16 may display user buttons over a plurality of pages. Also, the order in which the user buttons are displayed may be in ascending order or descending order based on the sign-in time, the user ID, or the user name included in the history information, for example.

When the first sign-in screen is displayed, the user refers to the information indicated in each user button and checks whether a user button corresponding to the user is displayed (i.e., whether his/her own history information is stored in the history information storage unit 17) (step S307). If a user button corresponding to the user is not displayed (i.e., if his/her own history information is not stored in the history information storage unit 17) (NO in step S307), the user touches the external account button. That is, in this case, the user cannot sign in using the first sign-in method. When the external account button is touched, the process proceeds to step S315.

On the other hand, if a user button corresponding to the user is displayed (i.e., if his/her own history information is stored in the history information storage unit 17) (YES in step S307), the user touches the user button corresponding to the user. The sign-in unit 16 refers to the history information of the user corresponding to the touched user button and acquires the account ID of the user's cloud account. Then, the sign-in unit 16 refers to the screen definition included in the application information and causes the operation panel 105 to display a cloud passcode input screen for entering the passcode of the cloud account (step S308). The passcode input screen is a screen prompting the user to enter the passcode of the cloud account (cloud passcode).

Figure 19:
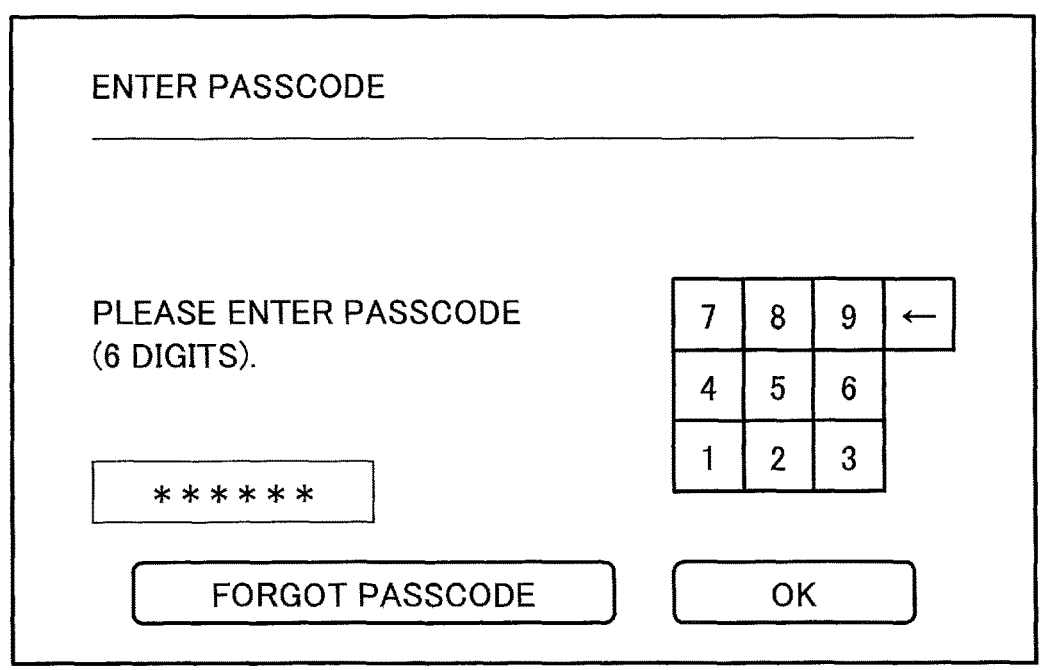
FIG. 19 is a diagram illustrating an example of a passcode input screen.

FIG. 19 is a diagram showing an example of the cloud passcode input screen for entering the pass code of the cloud account. The passcode input screen of FIG. 19 displays a numeric keypad for entering numbers, an apply button (OK button), and a reset button to be touched when the user has forgotten the passcode. The reset button is a button for resetting the passcode. Note that in some embodiments, the numeric keypad may be displayed on a separate screen that can be displayed simultaneously with the cloud passcode input screen on the operation panel 105, for example.

If the user has forgotten the passcode of his/her own cloud account, the user touches the reset button. If the reset button is touched (YES in step S309), the process proceeds to step S315.

On the other hand, if the user remembers the passcode of his/her own cloud account, the reset button is not touched (NO in step S309). In this case, the user touches the numeric keypad displayed on the passcode input screen to enter the passcode (six-digit number in the example of FIG. 19) (step S310) and touches the apply button.

When the apply button is touched, the sign-in unit 16 sends a sign-in request to the authentication management unit 22 of the cloud server 2 to sign in to the cloud service (step S311). At this time, the sign-in unit 16 notifies the authentication management unit 22 of the account ID of the user's cloud account and the passcode input by the user.

Upon receiving the sign-in request from the sign-in unit 16, the authentication management unit 22 executes authentication and authorization processes on the user based on a standard, such as Open ID Connect or OAuth 2.0 (step S312). Specifically, the authentication management unit 22 searches the account information table using the account ID notified by the sign-in unit 16 as a search key, and acquires the passcode stored in association with the account ID. Then, the authentication management unit 22 determines whether the acquired passcode matches the passcode notified by the sign-in unit 16 (step S313).

In the case where the acquired passcode and the passcode notified by the sign-in unit 16 do not match (NO in step S313), the authentication process fails and the authentication management unit 22 denies the user authorization to sign in to the cloud service and notifies the sign-in unit 16 that the user has been denied access to the cloud service. A mismatch of the passcodes may be result from an incorrect user button being selected by the user or an incorrect passcode being input by the user, for example. When the sign-in unit 16 is notified of the failure of the authentication process, the process returns to step S308. That is, the sign-in unit 16 displays the passcode input screen once again. At this time, the sign-in unit 16 may display a message indicating that an incorrect passcode was input on the passcode input screen, for example.

Note that in the present embodiment, the cloud account is preferably not locked even when an erroneous passcode is entered multiple times in a row, for example. Such a lockout feature is preferably not implemented so as to avoid a case where a third party (i.e., someone other than the actual user) triggers a lockout of the cloud account by entering an erroneous passcode, for example.

On the other hand, if the acquired passcode and the passcode notified by the sign-in unit 16 match (YES in step S313), the authentication process and the authorization process are deemed to be successful, and the authentication management unit 22 authorizes the user to sign in to the cloud service (Step S314). Then, the authentication management unit 22 notifies the service control unit 13 that the user has been authorized to sign in. At this time, the authentication management unit 22 notifies the service control unit 13 of the account information of the cloud account of the user that has been authorized to sign in. Note that the passcode of the cloud account is preferably not included in the account information notified by the authentication management unit 22. In this way, security of the information processing system can be improved.

Through the above-described process operations, the user can sign in to the cloud service using the first sign-in method. Thereafter, the process of FIG. 11 is executed. When the user signs in to the cloud service using the first sign-in method, this means that the passcode of the cloud account is already set up (YES in step S201), and history information of the user is already stored (YES in step S202). Thus, after updating the history information of the user (step S214), the service control unit 13 refers to the screen definition included in the application information and causes the operation panel 105 to display an after sign-in screen to be displayed after the user signs in to the cloud service (step S216).

In the following, process operations from step S315 and onward will be described. In step S315, the sign-in unit 16 refers to the screen definition included in the application information and causes the operation panel 105 to display a second sign-in screen of the cloud service. The second sign-in screen is a screen for selecting an external account to be used for signing in to the cloud service using the second sign-in method.

FIG. 20 is a diagram illustrating an example of the second sign-in screen. The second sign-in screen of FIG. 20 displays a "first service" button for using the account for the first service as the external account and a "second service" button for using the account for the second service as the external account.

When the second sign-in screen is displayed, the user selects an external account to be used for signing in (step S316). In the example of FIG. 20, the user can select the account for the first service by touching the "first service" button. Alternatively, the user can select the account for the second service by touching the "second service" button.

When the user selects the external account to be used for signing in, the sign-in unit 16 sends a sign-in request to the authentication management unit 22 of the cloud server 2 to enable the user to sign in to the cloud service (step S317). At this time, the sign-in unit 16 notifies the authentication management unit 22 of the external account selected by the user.

Note that in the case where the user has forgotten the passcode of his/her cloud account (YES in step S309), if the external service information is included in the history information of the user, the sign-in unit 16 can determine the external account to be used by the user by referring to the history information of the user. As such, in this case, the sign-in unit 16 may omit the processes of steps S315 and S316, for example. Also, in this case, when sending a sign-in request to the authentication management unit 22 of the cloud server 2 to enable the user to sign-in, the sign-in unit 16 may notify the authentication management unit 22 of the external account of the user determined based on the external service information included in the history information. By including the external service information in the history information as described above, the processing burden associated with signing in may be reduced, for example.

Upon receiving the sign-in request from the sign-in unit 16, the authentication management unit 22 performs authentication and authorization processes on the user based on standards, such as Open ID Connect and OAuth 2.0, in conjunction with the external server 3 corresponding to the service provider of the external account notified by the sign-in unit 16 (step S318). At this time, the authentication management unit 22 requests the user to input account information (user ID and passcode) of the external account via the operation panel 105 of the information processing terminal 1. The authentication management unit 22 executes the authentication and authorization processes on the user using the account information of the external account input by the user.

When the authentication and authorization processes are successful, the authentication management unit 22 authorizes the user to sign in to the cloud service (step S314) and notifies the service control unit 13 that the user has been authorized to sign in. At this time, the authentication management unit 22 sends to the service control unit 13, the account information of the external account of the user that has been authorized to sign in. Note that the passcode of the external account is preferably not included in the account information sent to the service control unit 13 by the authentication management unit 22. In this way, security of the information processing system can be improved.

By implementing the above-described process operations, the user can sign in to the cloud service using the second sign-in method. Thereafter, the process of FIG. 11 is executed.

As can be appreciated from the above, according to an aspect of the present embodiment, a user can sign in to a cloud service by entering a passcode that has been separately set up for the cloud account of the user rather than entering a passcode for the external account of the user. By setting up a simple passcode that is easy to enter as the passcode for the cloud account, the operation burden of entering the passcode upon signing in to the cloud service may be reduced, for example.

Second Embodiment

The information processing system according to a second embodiment of the present invention will be described below with reference to FIGS. 21 and 22. In the information processing system according to the present embodiment, measures are implemented to reduce the history information stored in the history information storage unit 17. Note that in the information processing system according to the present embodiment, the configurations of the information processing terminal 1, the cloud server 2, and the external server 3 may be substantially identical to those of the first embodiment.

FIG. 21 is a diagram illustrating an example of a history information table included in the history information storage unit 17 according to the present embodiment. The history information of FIG. 21 includes only the account ID of the cloud account.

FIG. 22 is a diagram illustrating an example of an account information table included in the account information storage unit 23 according to the present embodiment. The account information in FIG. 22 includes account information of the cloud account (account ID and passcode), sign-in time, and external account information (user name, email address, and external service name). That is, according to the present embodiment, information items other than the account ID that are included in the history information according to the first embodiment are stored in the account information storage unit 23.

According to the present embodiment, the account information (sign-in time and external service information) stored in the account information storage unit 23 is updated at the history information update timing according to the first embodiment. Upon updating the account information, the information processing terminal 1 notifies the cloud server 2 of the account ID of the cloud account as well as the sign-in time and the external service information.

Also, according to the present embodiment, upon displaying the first sign-in screen, the sign-in unit 16 may acquire from the cloud server 2, information to be indicated in the user button (e.g., email address and user name). In this way, the sign-in unit 16 can display the first sign-in screen that is substantially identical to the first sign-in screen displayed in the first embodiment (see FIG. 18).

As described above, according to an aspect of the present embodiment, the amount of information stored as history information in the history information storage unit 17 can be reduced. In this way, the storage capacity required in the history information storage unit 17 may be reduced. Also, the number of times the history information storage unit 17 is rewritten may be reduced to thereby prolong the service life of the storage device implementing the history information storage unit 17.

Third Embodiment

The information processing system according to a third embodiment of the present invention will be described below with reference to FIGS. 23 to 27. In the information processing system according to the present embodiment, the cloud server 2 stores the history information. Also, in the information processing system according to the present embodiment, the hardware configurations of the information processing terminal 1, the cloud server 2, and the external server 3 may be substantially the same as those of the first embodiment. In the following, features of the present embodiment that differ from those of the first embodiment will be mainly described.

Figure 23:
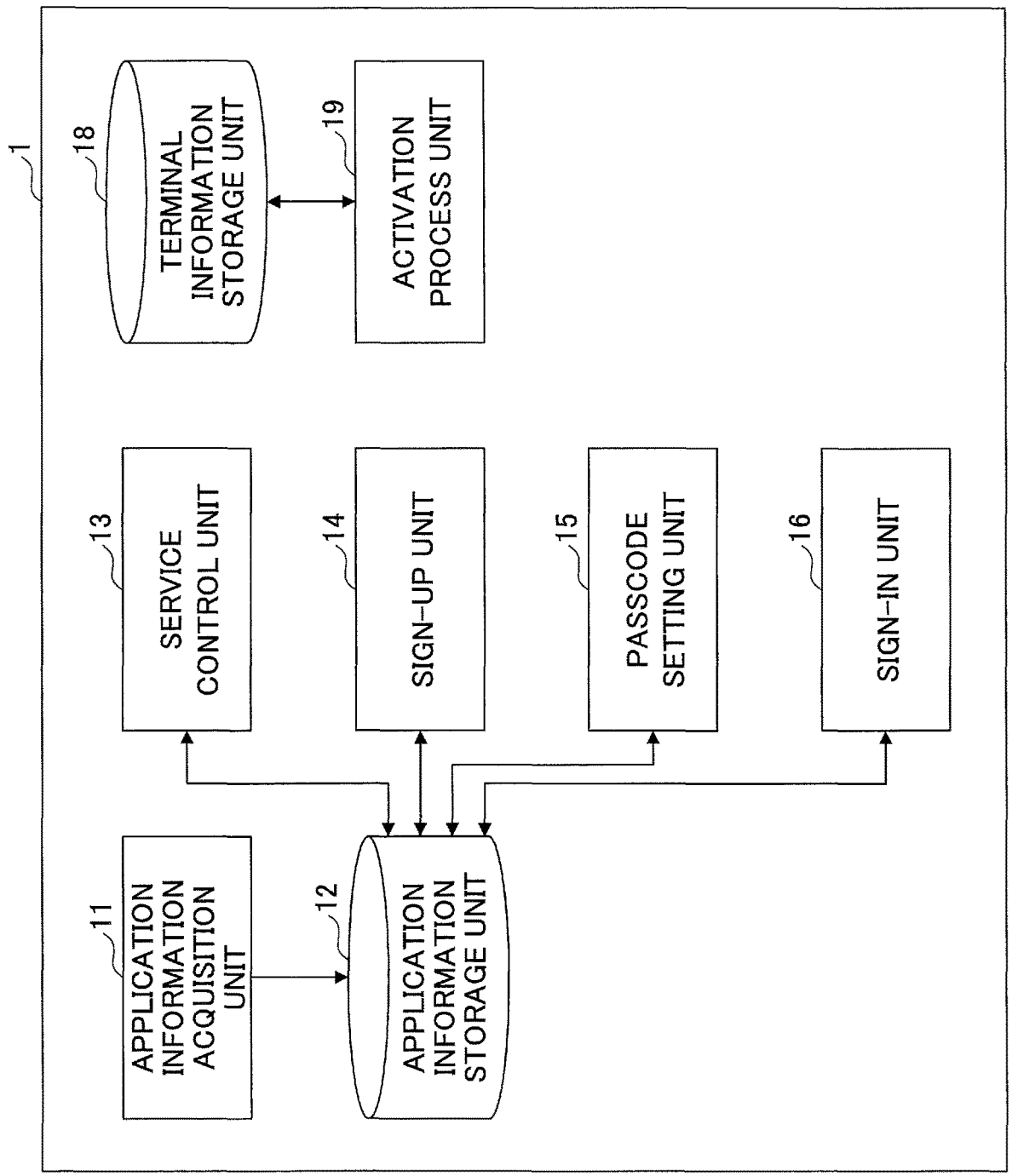
FIG. 23 is a diagram illustrating an example functional configuration of an information processing terminal according to a third embodiment of the present invention.

First, the functional configuration of the information processing terminal 1 according to the present embodiment will be described. FIG. 23 is a diagram illustrating an example functional configuration of the information processing terminal 1 according to the present embodiment. In FIG. 23, the information processing terminal 1 does not include the history information storage unit 17, but instead includes a terminal information storage unit 18 and an activation process unit 19.

The terminal information storage unit 18 stores information relating to the information processing terminal 1 (hereinafter referred to as "terminal information"). The terminal information includes a terminal ID and a secret uniquely assigned to the information processing terminal 1. The terminal ID is an identifier uniquely assigned to the information processing terminal 1. The secret is key information used when the information processing terminal 1 communicates with the cloud server 2. Unlike the terminal ID, the secret of the information processing terminal 1 can be initialized and changed to a different value when the installation location of the information processing terminal 1 is changed, for example. Note that the terminal information may include other information items, such as the device name, the installation location, the model name, and the IP address of the information processing terminal 1, for example.

The activation process unit 19 communicates with the cloud server 2 using the terminal ID and the secret, and executes process operations to be executed upon activating the cloud application (hereinafter referred to as "activation process"). The functions of the activation process unit 19 may be implemented by the CPU 101 executing the cloud application on a browser. In other words, the activation process unit 19 is not implemented by the information processing terminal 1 until the cloud application is executed.

Figure 24:
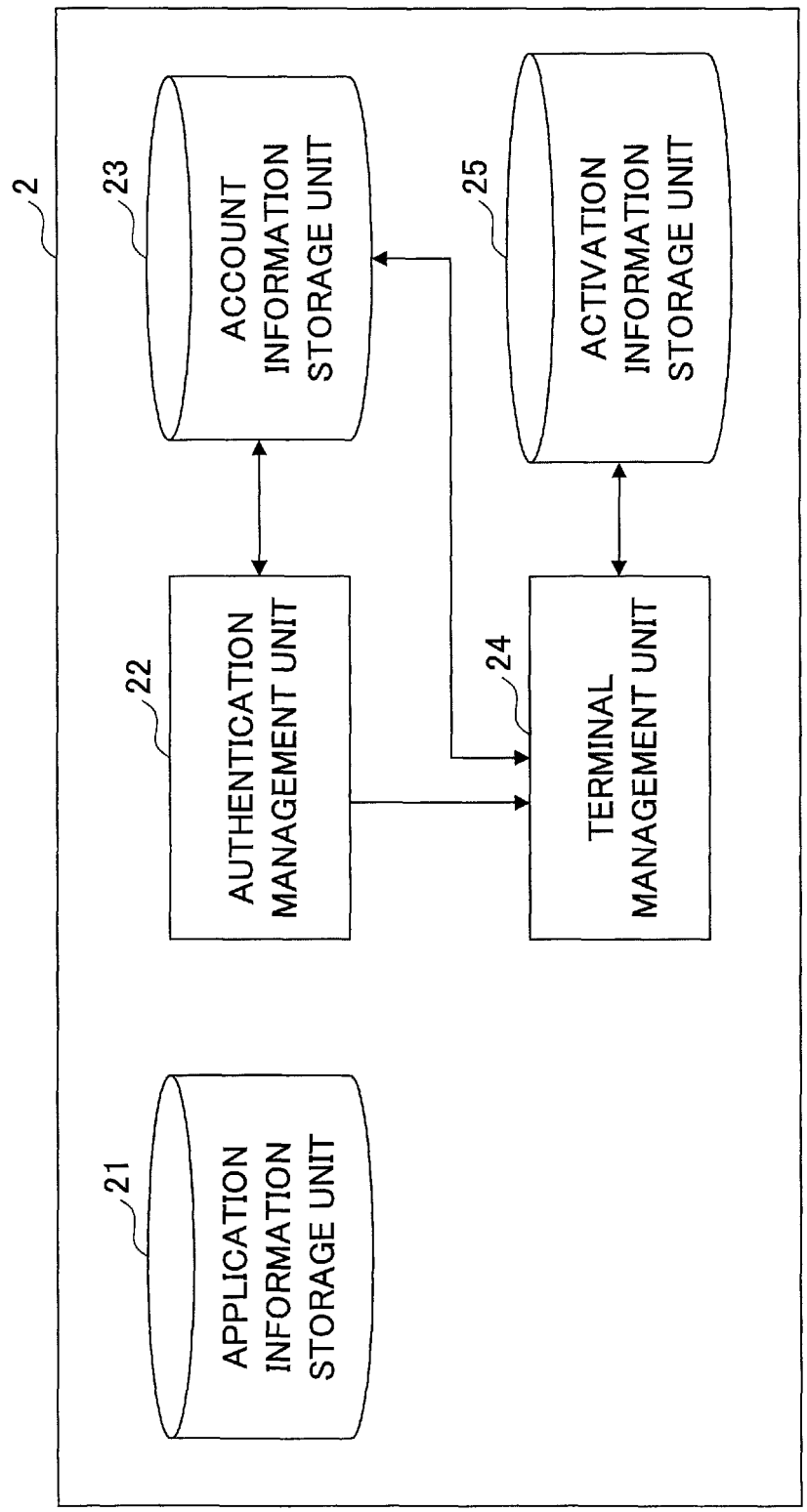
FIG. 24 is a diagram illustrating an example functional configuration of the cloud server according to the third embodiment.

In the following, the functional configuration of the cloud server 2 according to the present embodiment will be described. FIG. 24 is a diagram illustrating an example functional configuration of the cloud server 2 according to the present embodiment. In FIG. 24, the cloud server 2 includes a terminal management unit 24 and an activation information storage unit 25.

The terminal management unit 24 manages the information processing terminal 1. Specifically, the terminal management unit 24 generates an activation ID for the information processing terminal 1 that is not registered with the cloud service, and stores the activation ID in the activation information storage unit 25. In this way, the information processing terminal 1 may be registered with the cloud service. The activation ID is information identifying the information processing terminal 1 that has been registered with the cloud service. The terminal management unit 24 also issues an access token for the information processing terminal 1 that has been registered with the cloud service. The access token includes activation information of the information processing terminal 1.

The activation information storage unit 25 stores activation information of each information processing terminal 1 that has been registered with the cloud service. The activation information includes information items, such as activation ID, terminal ID, secret, and sign-in history. The sign-in history includes a history (record) of the (e.g., email address and user name) from the information processing terminal 1. In the present embodiment, the sign-in history stored in the activation information storage unit 25 and the account information stored in the account history storage unit 23 make up the history information.

The sign-in history preferably has the account IDs of the cloud accounts arranged in chronological order (ascending order or descending order) based on their sign-in times. In this way, the cloud server 2 may be able to determine the sign-in order of the cloud accounts used to sign in to the cloud service based on the sign-in history. Thus, in the present embodiment, the sign-in time does not necessarily have to be included in the account information stored in the account information storage unit 23, and as such, the storage capacity required for the account information storage unit 23 can be reduced.

Note that in a case where the sign-in history does not have the account IDs of the cloud accounts arranged in chronological order (ascending order or descending order) based on their sign-in times, the account information may include the sign-in time for each account ID as in the second embodiment, for example. Alternatively, the activation information may include the sign-in time for each account ID, for example.

In the following, the activation process executed upon activating the cloud application, the passcode setting process, and the sign-in process that are implemented in the information processing system according to the present embodiment will be described. Note that in the example described below, it is assumed that the information processing terminal 1 is an MFP.

Figure 25:
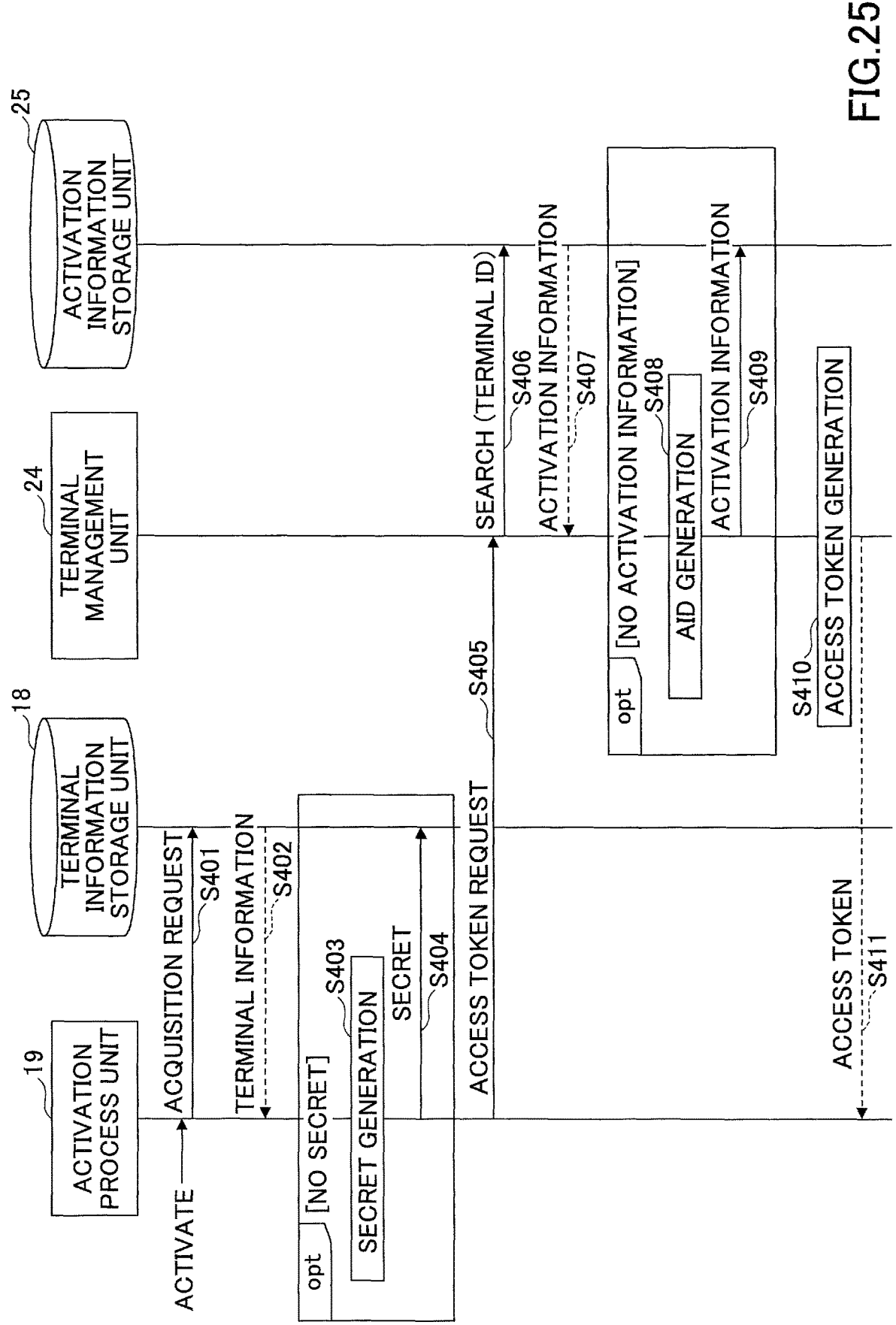
FIG. 25 is a sequence chart illustrating example process operations of an activation process executed when a cloud application is activated.

First, the activation process executed upon activating the cloud application will be described. FIG. 25 is a sequence chart illustrating example process operations of the activation process.

When the user activates the cloud application on the information processing terminal 1, the activation process unit 19 sends an acquisition request to the terminal information storage unit 18 to acquire terminal information of the information processing terminal 1 (terminal ID and secret) (step S401). Upon receiving the terminal information acquisition request from the activation process unit 19, the terminal information storage unit 18 sends the terminal information stored therein to the activation process unit 19 (step S402).

In the case where a secret is not included in the acquired terminal information (a secret is not stored in the terminal information storage unit 18), the activation process unit 19 generates a secret (step S403) and sends the generated secret to the terminal information storage unit 18 (step S404).

Upon acquiring (or generating) the terminal information, the activation process unit 19 sends the acquired terminal information to the terminal management unit 24 of the cloud server 2 and requests the terminal management unit 24 to issue an access token (step S405).

Upon being requested to issue an access token, the terminal management unit 24 searches the activation information storage unit 25 using the terminal ID included in the received terminal information as a search key (step S406) and acquires activation information including the terminal ID from activation information storage unit 25 (step S407).

Note that in a case where no activation information is stored in the activation information storage unit 25 (when the information processing terminal 1 is not registered with the cloud service), the terminal management unit 24 generates an activation ID (AID) (step S408). Similarly, in a case where the secret included in the acquired activation information does not match the secret included in the received terminal information (when the secret is updated after registration of the information processing terminal 1), the terminal management unit 24 generates the activation ID (AID).

In either case, the terminal management unit 24 generates activation information including the generated activation ID and the received terminal information, and stores the generated activation information in the activation information storage unit 25. In this way, the information processing terminal 1 is registered with the cloud service. Note that an account ID is not included in the sign-in history of the activation information at the time the activation information is generated.

Upon acquiring (or generating) the activation information, the terminal management unit 24 generates an access token including the acquired (or generated) activation information (step S410) and sends the generated access token to the activation process unit 19 (step S411).

Thereafter, the information processing terminal 1 communicates with the cloud server 2 using this access token. Also, authentication and authorization processes are executed using this access token.

Figure 26:
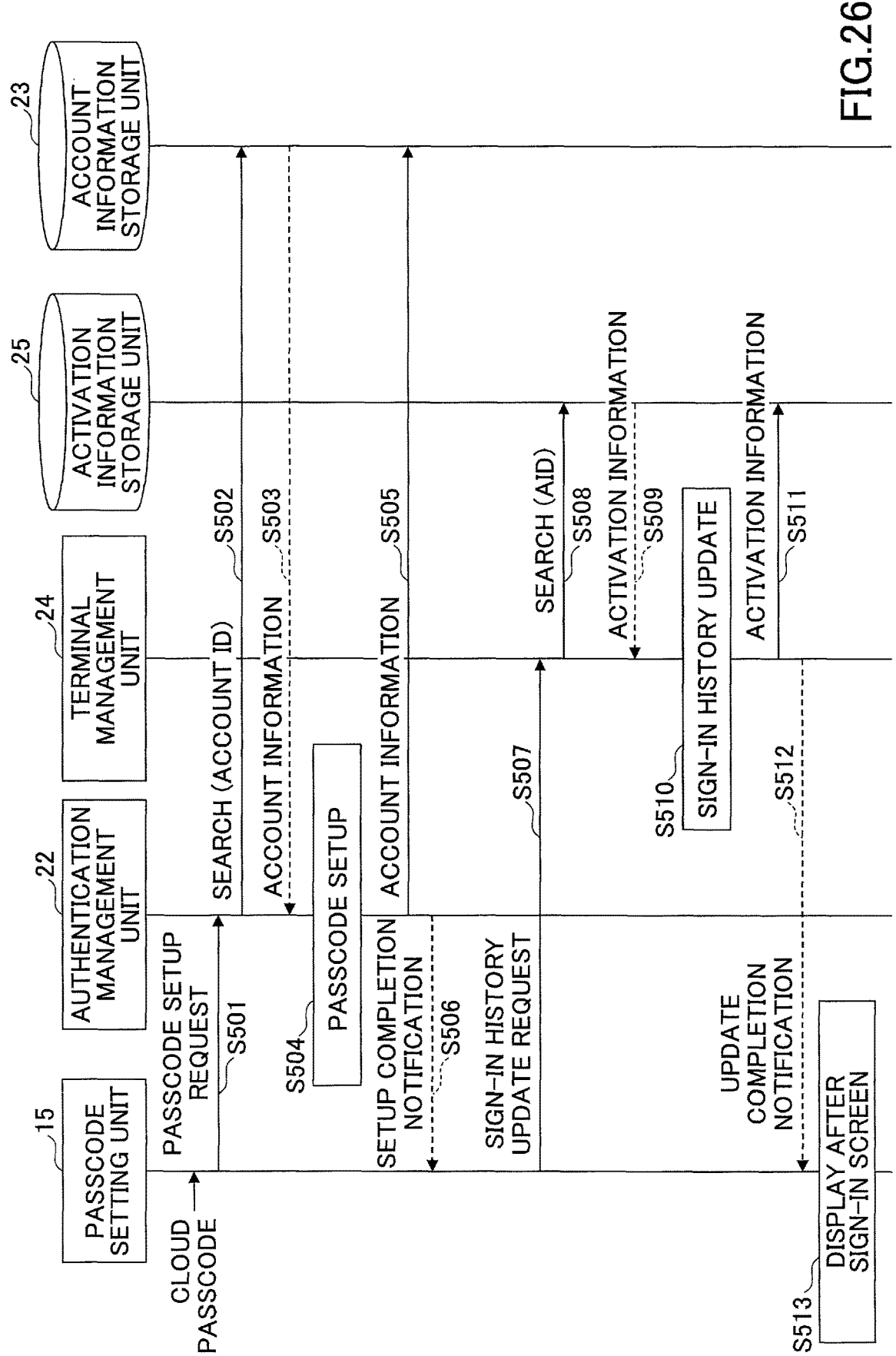
FIG. 26 is a sequence chart illustrating example process operations of the passcode setting process.

In the following, the passcode setting process according to the present embodiment will be described. FIG. 26 is a sequence chart illustrating example process operations of the passcode setting process according to the present embodiment. Note that the process operations of FIG. 26 correspond to the process operations of steps S211 to S216 of FIG. 11 and may be executed when a user signs up with the cloud service or when a user is resetting the passcode, for example.

If the passcode entered in the passcode setting screen and the passcode entered in the passcode confirmation screen match (YES in step S210), the passcode setting unit 15 sends the account information of the user to the authentication management unit 22 and requests the authentication management unit 22 to set up the passcode (step S501). The account information includes the account ID of the user and the passcode entered in the passcode setting screen and the passcode confirmation screen.

Upon receiving the account information of the user from the passcode setting unit 15, the authentication management unit 22 searches the account information storage unit 23 using the account ID included in the received account information as a search key (step S502). Then, the authentication management unit 22 acquires from the account information storage unit 23, account information including the received account ID (account information of the user) (step S503).

Upon acquiring the account information, the authentication management unit 22 sets up the passcode included in the account information received from the passcode setting unit 15 as the passcode of the acquired account information (step S504). Note that in a case where the acquired account information already includes a passcode that has been previously set up, the authentication management unit 22 updates the passcode of the acquired account information to the passcode included in the account information received from the passcode setting unit 15.

After the authentication management unit 22 sets up the passcode in the acquired account information, the authentication management unit 22 stores the account information including the passcode that has been set up in the account information storage unit 23 (step S505). Thereafter, the authentication management unit 22 sends a passcode setting completion notification to the passcode setting unit 15 to notify the completion of the passcode setting process (step S506).

Upon receiving the passcode setting completion notification, the passcode setting unit 15 sends the account ID of the user and the activation ID included in the access token acquired upon executing the activation process to the terminal management unit 24 and requests the terminal management unit 24 to update the sign-in history (step S507).

Upon receiving the sign-in history update request, the terminal management unit 24 searches the activation information storage unit 25 using the activation ID received from the passcode setting unit 15 as a search key (step S508). Then, the terminal management unit 24 acquires from the activation information storage unit 25, activation information including the activation ID received from the passcode setting unit 15 (step S509).

Upon acquiring the activation information from the activation information storage unit 25, the terminal management unit 24 updates the sign-in history included in the acquired activation information (step S510). Specifically, the terminal management unit 24 adds the account ID received from the passcode setting unit 15 to the sign-in history.

After updating the sign-in history, the terminal management unit 24 saves the activation information including the updated sign-in history in the activation information storage unit 25 (step S511). Thereafter, the terminal management unit 24 sends an update completion notification to the passcode setting unit 15 to notify the completion of the sign-in history updating process (step S512).

Upon receiving the sign-in history update completion notification from the terminal management unit 24, the passcode setting unit 15 refers to the screen definition included in the application information and causes the operation panel 105 to display the after sign-in screen to be displayed after signing in to the cloud service (step S513).

By implementing the above-described process operations, the sign-in history of each user can be stored in the cloud server 2 with respect to each information processing terminal 1. In other words, the cloud server 2 can store and manage the sign-in history of each user with respect to each information processing terminal 1 included in the information processing system.

Note that if the process of setting up (updating) the passcode in step S504 and/or the process of storing the account information including the passcode in step S505 end in failure, the authentication management unit 22 notifies the passcode setting unit 15 of the failure. In turn, the passcode setting unit 15 refers to the screen definition included in the application information and causes the operation panel 105 to display the error screen as illustrated in FIG. 15, for example.

Similarly, if the process of updating the sign-in history in step S510 and/or the process of storing the activation information including the updated sign-in history in step S511 end in failure, the terminal managing unit 24 notifies the passcode setting unit 15 of the failure. In turn, the passcode setting unit 15 refers to the screen definition included in the application information and causes the operation panel 105 to display the error screen as illustrated in FIG. 16, for example.

Figure 27:
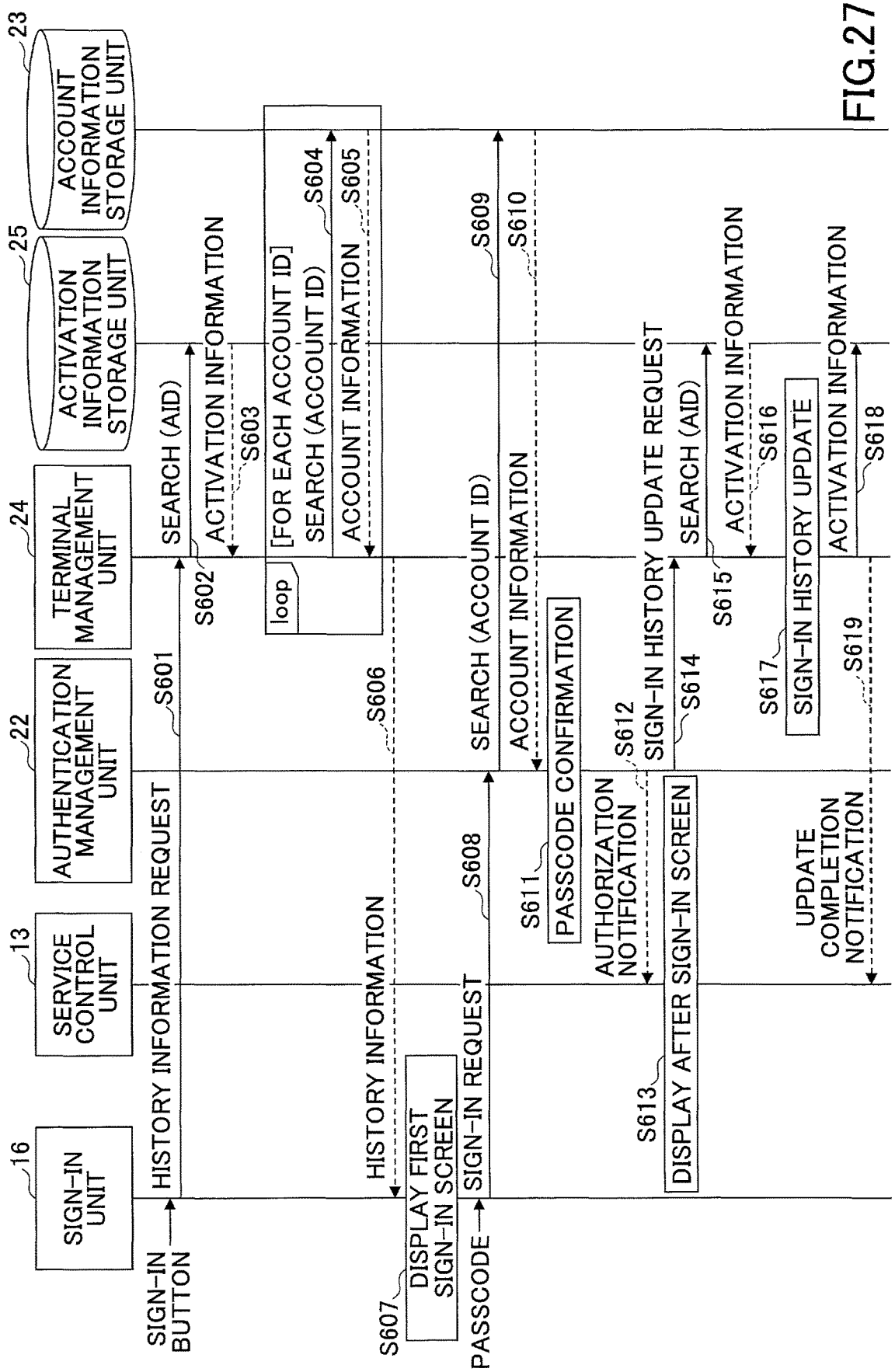
FIG. 27 is a sequence chart illustrating example process operations of the sign-in process.

In the following, the sign-in process according to the present embodiment will be described. FIG. 27 is a sequence chart illustrating example process operations of the sign-in process according to the present embodiment. Note that the process operations of FIG. 27 correspond to the process operations of steps S305 to S314 of FIG. 17.

When the user touches the sign-in button on the top screen (step S304), the sign-in unit 16 sends the activation ID of the information processing terminal 1 along with a history information request to the terminal management unit 24 (step S601).

Upon receiving the history information request from the sign-in unit 16, the terminal management unit 24 searches the activation information storage unit 25 using the activation ID received from the passcode setting unit 15 as a search key (step S602). Then, the terminal management unit 24 acquires from the activation information storage unit 25, activation information including the activation ID received from the passcode setting unit 15 (step S603).

After acquiring the activation information, the terminal management unit 24 searches the account information storage unit 23 using the account ID included in the sign-in history of the acquired activation information as a search key (step S604). Then, the terminal management unit 24 acquires from the account information storage unit 23, account information including the account ID corresponding to the search key (step S605). The terminal management unit 24 repeats the processes of steps S604 and S605 with respect to each account ID included in the acquired activation information.

Note that the account information acquired by the terminal management unit 24 in step S605 corresponds to the account information of the user that has signed in to the cloud service from the information processing terminal 1. That is, the account information acquired in step S605 corresponds to the history information of the user. Then, the terminal management unit 24 sends the acquired history information to the sign-in unit 16 (step S606).

Upon acquiring the history information, the sign-in unit 16 refers to the screen definition included in the application information and causes the operation panel 105 to display the first sign-in screen of the cloud service (step S607).

Thereafter, when the user touches the user button corresponding to the user, enters the passcode, and touches the apply button (OK button), the sign-in unit 16 sends the account information of the user along with a sign-in request to the authentication management unit 22 to sign in to the cloud service (step S608).

Upon receiving the sign-in request from the sign-in unit 16, the authentication management unit 22 performs authentication and authorization processes on the user based on standards, such as Open ID Connect and OAuth 2.0. Specifically, the authentication management unit 22 searches the account information storage unit 23 using the account ID included in the account information received from the sign-in unit 16 as a search key (step S609), and acquires from the account information storage unit 23, account information including the account ID corresponding to the search key (step S610). The authentication management unit 22 then determines whether the passcode included in the acquired account information matches the passcode included in the account information received from the sign-in unit 16 (step S611).

If the passcode included in the acquired account information and the passcode included in the account information received from the sign-in unit 16 match, the authentication and authorization processes are deemed to be successful. Upon successful authentication and authorization, the authentication management unit 22 notifies the service control unit 13 that the user is authorized to sign in to the cloud service (step S612). Thereafter, the service control unit 13 causes the operation panel 105 to display the after sign-in screen to be displayed after signing in to the cloud service (step S613).

Also, upon successful authentication and authorization, the authentication management unit 22 sends the account ID of the user and the activation ID of the information processing terminal 1 along with a sign-in history update request to the terminal management unit 24 to update the sign-in history (step S614).

Upon receiving the sign-in history update request from the authentication management unit 22, the terminal management unit 24 searches the activation information storage unit 25 using the activation ID received from the authentication management unit 22 as a search key (step S615). Then, the terminal management unit 24 acquires from the activation information storage unit 25, activation information including the activation ID corresponding to the search key (step S616).

Upon acquiring the activation information, the terminal management unit 24 updates the sign-in history included in the acquired activation information (step S617). Specifically, the terminal management unit 24 adds the account ID received from the authentication management unit 22 to the sign-in history included in the acquired activation information.

After updating the sign-in history, the terminal management unit 24 stores the activation information including the updated sign-in history in the activation information storage unit 25 (step S618). Thereafter, the terminal management unit 24 sends a sign-in history update completion notification to the service control unit 13 to notify the completion of the sign-in history updating process (step S619).

By implementing the above-described process operations, the user can sign in to the cloud service using the history information stored in the cloud server 2.

Note that when no account ID is included in the sign-in history of the activation information received in step S603 (i.e., when no history information is stored), the terminal management unit 24 may notify the sign-in unit 16 of the absence of history information. In this case, the sign-in unit 16 may refer to the screen definition included in the application information and cause the operation panel 105 to display the second sign-in screen of the cloud service, for example.

Also, note that when the passcodes do not match in step S611 such that the authentication and authorization processes end in failure, the authentication management unit 22 may notify the sign-in unit 16 of the failure. In this case, the sign-in unit 16 may cause the operation panel 105 to display the passcode input screen once again.

Also, note that when at least one of the processes of updating and storing the history information in steps S617 and S618 end in failure, the terminal managing unit 24 may notify the service control unit 13 of the failure. In this case, the service control unit 13 may refer to the screen definition included in the application information and cause the operation panel 105 to display the error screen as illustrated in FIG. 16, for example. Note, however, that the error screen does not necessarily have to be displayed in such case. As described above, according to an aspect of the present embodiment, process operations substantially similar to the above-described process operations of the first embodiment may be implemented using history information stored in the cloud server 2 to obtain substantially similar effects. Thus, by setting up a passcode that is easy to enter as the passcode of the cloud account, the operation burden of entering the passcode when signing in to the cloud service may be reduced.

Further, according to an aspect of the present embodiment, the information processing terminal 1 does not have to include the history information storage unit 17, and as such, the storage capacity required for the information processing terminal 1 can be reduced.

Note that although the history information is configured to include an account ID of a cloud account in the above-described embodiments, the history information may alternatively include a user name, a user ID, or some other type of information that can identify the cloud account, instead of the account ID, for example.

Further, although the present invention has been described above with reference to certain illustrative embodiments, the present invention is not limited to these embodiments, and numerous variations and modifications may be made without departing from the scope of the present invention.

What is claimed is:

1. An information processing system comprising:
 a cloud server including a storage device storing a program for using a cloud service and account information of a cloud account that is registered with the cloud service, and a first processor configured to manage execution of an authentication process for controlling access to the cloud service; and an information processing terminal including a second processor configured to execute processes of acquiring the program from the cloud server;

sending a sign-up request to the cloud server to sign up for the cloud service using an external account of an external service, said external account of the external service having a passcode or a character string to be used for signing therein;

sending a setup request to the cloud server to set up a passcode or a character string to be used for signing in to the cloud service, said passcode or the character string being created by a user of the information processing terminal at the information processing terminal and different from that of the external account of the external service; and sending a sign-in request to the cloud server to sign in to the cloud service using the cloud account.

2. The information processing system according to claim 1, wherein the first processor of the cloud server executes the authentication process for controlling access to the cloud service in conjunction with the external server that provides the external service, using the external account, in response to receiving the sign-up request from the second processor of the information processing terminal.

3. The information processing system according to claim 1, wherein the first processor of the cloud server executes the authentication process for controlling access to the cloud service, using the cloud account, in response to receiving the sign-in request from the second processor of the information processing terminal.

4. The information processing system according to claim 1, wherein the information processing terminal further includes a history information storage unit configured to store history information of one or more users that have signed in to the cloud service from the information processing terminal.

5. The information processing system according to claim 4, wherein the history information storage unit stores at least one of a cloud account identifier identifying the cloud account used to sign in, a sign-in time, a user ID, a user name, and information relating to the external service used to sign up as the history information.

6. The information processing system according to claim 4, wherein the second processor of the information processing terminal is further configured to execute processes of displaying one or more user buttons corresponding to the one or more users specified by the history information stored in the history information storage unit, and sending the sign-in request to the cloud server to sign in to the cloud service using the cloud account of a user corresponding to a selected user button that has been selected from the one or more user buttons displayed.

7. The information processing system according to claim 1, wherein the second processor of the information processing terminal is further configured to execute an activation process when the program is activated, the activation process including sending to the cloud server, a terminal identifier and a secret uniquely assigned to the information processing terminal, and requesting the cloud server to generate an access token.

8. The information processing system according to claim 1, wherein the first processor of the cloud server is further configured to generate activation information including an identifier identifying the information processing terminal that is registered with the cloud service, a terminal identifier unique to the information processing terminal, and a sign-in history of the information processing terminal signing in to the cloud service.

9. The information processing system according to claim 8, wherein the sign-in history includes cloud account identifiers of cloud accounts that have been used to sign in to the cloud service, the cloud account identifiers being arranged in chronological order based on sign-in times of the cloud accounts.

10. An information processing terminal comprising:

a processor that executes a program for using a cloud service, the processor being configured to implement processes of acquiring the program for using the cloud service from a cloud server that stores the program;

sending a sign-up request to the cloud server to sign up for the cloud service using an external account of an external service;

sending a setup request to the cloud server to set up a passcode or a character string to be used for signing in to the cloud service, said passcode or the character string being created by a user of the information processing terminal at the information processing terminal and different from that of the external account of the external service; and sending a sign-in request to the cloud server to sign in to the cloud service using the cloud account.

11. The information processing terminal according to claim 10, further comprising:

a history information storage unit configured to store history information of one or more users that have signed in to the cloud service from the information processing terminal.

12. The information processing terminal according to claim 11, wherein the history information storage unit stores at least one of a cloud account identifier identifying the cloud account used to sing in, a sign-in time, a user ID, a user name, and information relating to the external service used to sign up as the history information.

13. The information processing terminal according to claim 11, wherein the processor is further configured to implement processes of displaying one or more user buttons corresponding to the one or more users specified by the history information stored in the history information storage unit, and sending the sign-in request to the cloud server to sign in to the cloud service using the cloud account of a user corresponding to a selected user button that has been selected from the one or more user buttons displayed.

14. The information processing terminal according to claim 10, wherein the processor is further configured to implement an activation process when the program is activated, the activation process including sending to the cloud server, a terminal identifier and a secret uniquely assigned to the information processing terminal, and requesting the cloud server to generate an access token.

15. An information processing method comprising steps of:
    acquiring a program for using a cloud service from a cloud server that stores the program;
    sending a sign-up request to the cloud server to sign up for the cloud service using an external account of an external service, said external account of the external service having a passcode or a character string to be used for signing therein;
    sending a setup request to the cloud server to set up a passcode or a character string to be used for signing in to the cloud service, said passcode or the character string being created by a user of the information processing terminal at the information processing terminal and different from that of the external account of the external service; and
    sending a sign-in request to the cloud server to sign in to the cloud service using the cloud account.

16. The information processing system according to claim 4, wherein the information processing terminal is one of personal computer and a mobile terminal.

17. The information processing system according to claim 1, wherein the history information storage unit is located inside the information processing terminal.

* * * * *